(12) United States Patent
Baijal

(10) Patent No.: US 11,735,144 B2
(45) Date of Patent: Aug. 22, 2023

(54) IMAGE DISPLAY APPARATUS AND IMAGE DISPLAYING METHOD

(71) Applicant: SAMSUNG ELECTRONICS CO., LTD., Suwon-si (KR)

(72) Inventor: Anant Baijal, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 346 days.

(21) Appl. No.: 17/141,832

(22) Filed: Jan. 5, 2021

(65) Prior Publication Data
US 2021/0210054 A1 Jul. 8, 2021

(30) Foreign Application Priority Data

Jan. 6, 2020 (KR) .......... 10-2020-0001571
Apr. 13, 2020 (KR) .......... 10-2020-0044780

(51) Int. Cl.
| | | |
|---|---|---|
| G09G 5/36 | (2006.01) | |
| G06T 5/00 | (2006.01) | |
| G06T 5/10 | (2006.01) | |
| G09G 3/20 | (2006.01) | |

(52) U.S. Cl.
CPC ............ *G09G 5/363* (2013.01); *G06T 5/003* (2013.01); *G06T 5/10* (2013.01); *G09G 3/20* (2013.01); *G06T 2207/20084* (2013.01); *G09G 2340/0407* (2013.01); *G09G 2340/0457* (2013.01)

(58) Field of Classification Search
CPC .. G09G 5/363; G09G 3/20; G09G 2340/0407; G09G 2340/0457; G09G 2340/00; G09G 2340/04; G06T 5/003; G06T 5/10; G06T 2207/20084; G06T 2207/20021; G06T 2207/20056
See application file for complete search history.

(56) References Cited

U.S. PATENT DOCUMENTS

| | | |
|---|---|---|
| 7,181,082 B2 | 2/2007 | Feng |
| 8,107,765 B2 | 1/2012 | Hwang et al. |
| 9,066,025 B2 | 6/2015 | Tao et al. |
| 9,361,672 B2 | 6/2016 | Umanskyi et al. |

(Continued)

FOREIGN PATENT DOCUMENTS

| | | |
|---|---|---|
| JP | 2010-73074 A | 4/2010 |
| JP | 2014164574 A | 9/2014 |

(Continued)

OTHER PUBLICATIONS

Communication dated Jun. 7, 2021 issued by the European Patent Office in European Application No. 21150314.9.

(Continued)

*Primary Examiner* — Pegeman Karimi
(74) *Attorney, Agent, or Firm* — Sughrue Mion, PLLC

(57) ABSTRACT

An image display apparatus includes a display; a memory configured to store at least one instruction; and a processor configured to execute the at least one instruction stored in the memory to: estimate a blur level of each sub-area of a plurality of sub-areas included in a first image; and improve a resolution of at least one sub-area of the plurality of sub-areas, based on an estimated blur level of the at least one sub-area. The display is configured to output a second image including the at least one sub-area having the improved resolution.

19 Claims, 20 Drawing Sheets

(56) References Cited

U.S. PATENT DOCUMENTS

| | | | |
|---|---|---|---|
| 2004/0120598 A1 | 6/2004 | Feng | |
| 2011/0019096 A1 | 1/2011 | Lee et al. | |
| 2011/0267539 A1 | 11/2011 | Terada et al. | |
| 2019/0114742 A1 | 4/2019 | Wang | |
| 2019/0325557 A1* | 10/2019 | Chae | G06T 5/003 |
| 2019/0333191 A1* | 10/2019 | Chae | G06T 5/002 |
| 2020/0410645 A1* | 12/2020 | Higaki | G06T 5/002 |

FOREIGN PATENT DOCUMENTS

| | | |
|---|---|---|
| JP | 201953588 A | 4/2019 |
| KR | 1020090032807 A | 4/2009 |

OTHER PUBLICATIONS

Perry, S0 et al., "Weight Assignment for Adaptive Image Restoration by Neural Networks", IEEE Transaction on Neural Networks, vol. 11, No. 1, Jan. 2000, pp. 156-170.
International Search Report (PCT/ISA/210) and Written Opinion (PCT/ISA/237) dated Apr. 16, 2021 issued by the International Searching Authority in International Application No. PCT/KR2021/000082.

* cited by examiner

IMAGE DISPLAY APPARATUS AND IMAGE DISPLAYING METHOD

CROSS-REFERENCE TO RELATED APPLICATIONS

This application is based on and claims priority under 35 U.S.C. § 119 to Korean Patent Application No. 10-2020-0001571, filed on Jan. 6, 2020, and Korean Patent Application No. 10-2020-0044780, filed on Apr. 13, 2020, in the Korean Intellectual Property Office, the disclosures of which are incorporated by reference herein in their entireties.

BACKGROUND

1. Field

The disclosure relates to an image display apparatus and an operation method thereof, and more particularly, to an image display apparatus and a method for estimating a blur level of a blurry image in a frequency domain and improving the resolution of the blurry image in a spatial domain by using the estimated blur level.

2. Description of Related Art

With the enlargement of display apparatuses and development of technology, a resolution of the display apparatuses is continuously increasing. To output an image having a low resolution, a high-resolution display apparatus increases the size of an image by using a scaler. Because the scaler improves the resolution of the image, based on interpolation, loss may occur in a high frequency area of the image, and a blur may be generated in a boundary portion of an object in the image. The blur causes degradation of the quality of an image by affecting details of the image.

SUMMARY

Provided are an image display apparatus and a method for efficiently removing a blur in a blurry image by using both a frequency domain and a spatial domain.

Provided are an image display apparatus and a method for estimating a blur level of an image in a frequency domain.

Provided are an image display apparatus and a method for improving a resolution of a blurry image by using one or more of a model and a filter each suitable for an image by using a blur level estimated in a spatial domain.

Provided are an image display apparatus and a method for estimating respective blur levels of sub-areas included in an image and improving respective resolutions of the sub-areas by using the estimated blur levels.

Additional aspects will be set forth in part in the description which follows and, in part, will be apparent from the description, or may be learned by practice of the presented embodiments of the disclosure.

In accordance with an aspect of the disclosure, there is provided an image display apparatus including: a display; a memory configured to store at least one instruction; and a processor configured to execute the at least one instruction stored in the memory to: estimate a blur level of each sub-area of a plurality of sub-areas included in a first image; and improve a resolution of at least one sub-area of the plurality of sub-areas, based on an estimated blur level of the at least one sub-area, wherein the display is configured to output a second image including the at least one sub-area having the improved resolution.

The processor may be further configured to execute the at least one instruction to split the first image into the plurality of sub-areas in a spatial domain; transform each sub-area of the plurality of sub-areas into a frequency domain, and estimate the blur level of each sub-area of the plurality of sub-areas in the frequency domain; and improve the resolution of the at least one sub-area in the spatial domain.

The processor may be further configured to execute the at least one instruction to identify at least one sub-area of which the estimated blur level is equal to or greater than a threshold value, and improve a resolution of the identified at least one sub-area.

The processor may be further configured to execute the at least one instruction to obtain a signal on the frequency domain by performing a Fourier transform on each sub-area of the plurality of sub-areas, obtain a power spectrum for the signal on the frequency domain, and estimate the blur level of each sub-area of the plurality of sub-areas from an inclination of a spectral envelope obtained from the power spectrum.

The processor may be further configured to execute the at least one instruction to obtain a bin index of a point at which the inclination of the spectral envelope starts to change to be greater than a predetermined reference value, and estimate the blur level to increase as a value of the bin index increases.

The processor may be further configured to execute the at least one instruction to independently improve respective resolutions of at least two sub-areas of the plurality of sub-areas, based on the estimated blur level of each sub-area of the at least two sub-areas.

The processor may be further configured to execute the at least one instruction to select an image restoration model from a plurality of image restoration models, based on an estimated blur level of a sub-area of the at least one sub-area, and improve a resolution of the sub-area, according to the selected image restoration model.

The processor may be further configured to execute the at least one instruction to determine a number of times to apply an image restoration model, based on an estimated blur level of a sub-area of the at least one sub-area, and improve a resolution of the sub-area by repeatedly applying the image restoration model to the sub-area the determined number of times.

The processor may be further configured to execute the at least one instruction to correct a value of a hyperparameter of a neural network, based on an estimated blur level of a sub-area of the at least one sub-area, and improve a resolution of the sub-area by using the neural network having the corrected value of the hyperparameter.

The value of the hyperparameter may include at least one of a filter coefficient, a filter size, a kernel size, or a weight value of a node of the neural network.

The processor may be further configured to execute the at least one instruction to design a filter, based on an estimated blur level of a sub-area of the at least one sub-area, and improve a resolution of the sub-area by applying the designed filter to the sub-area.

The processor may be further configured to execute the at least one instruction to: obtain a signal of a predetermined band by filtering the sub-area, by using a band pass filter (BPF) designed based on the estimated blur level of the sub-area; generate a harmonics signal by applying a non-linear function to the obtained signal of the predetermined band; obtain a signal of a high frequency band from the harmonics signal by filtering the harmonics signal by using a high pass filter (HPF) designed based on the estimated blur level; and restore the sub-area having an improved resolution, from the obtained signal of the high frequency band and a signal of the sub-area in a band other than the high frequency band.

In accordance with an aspect of the disclosure, there is provided an image displaying method including: estimating a blur level of each sub-area of a plurality of sub-areas included in a first image; improving a resolution of at least one sub-area of the plurality of sub-areas, based on an estimated blur level of the at least one sub-area; and outputting a second image including the at least one sub-area of which the resolution has been improved.

The estimating may include splitting the first image into the plurality of sub-areas in in a spatial domain; and transforming each sub-area of the plurality of sub-areas into a frequency domain and estimating the blur level of each sub-area of the plurality of sub-areas in the frequency domain. The improving may include identifying at least one sub-area of which the estimated blur level is equal to or greater than a threshold value; and improving a resolution of the identified at least one sub-area.

The transforming each sub-area and the estimating the blur level may include: obtaining a signal on the frequency domain by performing Fourier transformation on each sub-area of the plurality of sub-areas; obtaining a power spectrum for the signal on the frequency domain; obtaining a bin index of a point at which an inclination of a spectral envelope, obtained from the power spectrum, starts to change to be greater than a predetermined reference value; and estimating the blur level to increase as a value of the bin index increases.

The improving the resolution of the identified at least one sub-area may include independently improving respective resolutions of at least two sub-areas of the plurality of sub-areas, based on an estimated blur level of each sub-area of the at least two sub-areas.

The improving the resolution of the identified at least one sub-area may include selecting an image restoration model from a plurality of image restoration models, based on an estimated blur level of a sub-area of the at least one sub-area; and improving a resolution of the sub-area according to the selected image restoration model.

The improving the resolution of the identified at least one sub-area may include determining a number of times to apply an image restoration model, based on an estimated blur level of a sub-area of the at least one sub-area; and improving a resolution of the sub-area by repeatedly applying the image restoration model to the sub-area the determined number of times.

The improving the resolution of the identified at least one sub-area may include correcting a value of a hyperparameter of a neural network, based on an estimated blur level of a sub-area of the at least one sub-area; and improving a resolution of the sub-area by using the neural network having the corrected value of the hyperparameter.

The value of the hyperparameter may include at least one of a filter coefficient, a filter size, a kernel size, or a weight value of a node of the neural network.

The improving may include designing a filter, based on an estimated blur level of a sub-area of the at least one sub-area; and improving a resolution of the sub-area by applying the designed filter to the sub-area.

The designing the filter may include obtaining a signal of a predetermined band by filtering the sub-area, by using a band pass filter (BPF) designed based on the estimated blur level of the sub-area; generating a harmonics signal by applying a nonlinear function to the obtained signal of the predetermined band; obtaining a signal of a high frequency band from the harmonics signal by filtering the harmonics signal by using a high pass filter (HPF), the HPF being designed based on the estimated blur level of the sub-area; and restoring the sub-area having an improved resolution, from the obtained signal of the high frequency band and a signal of the sub-area in a band other than the high frequency band.

In accordance with an aspect of the disclosure, there is provided a computer-readable recording medium having recorded thereon a program executable by at least one processor to perform: estimating a blur level of each sub-area of a plurality of sub-areas included in a first image; improving a resolution of at least one sub-area of the plurality of sub-areas, based on an estimated blur level of the at least one sub-area; and outputting a second image including the at least one sub-area of which the resolution has been improved.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
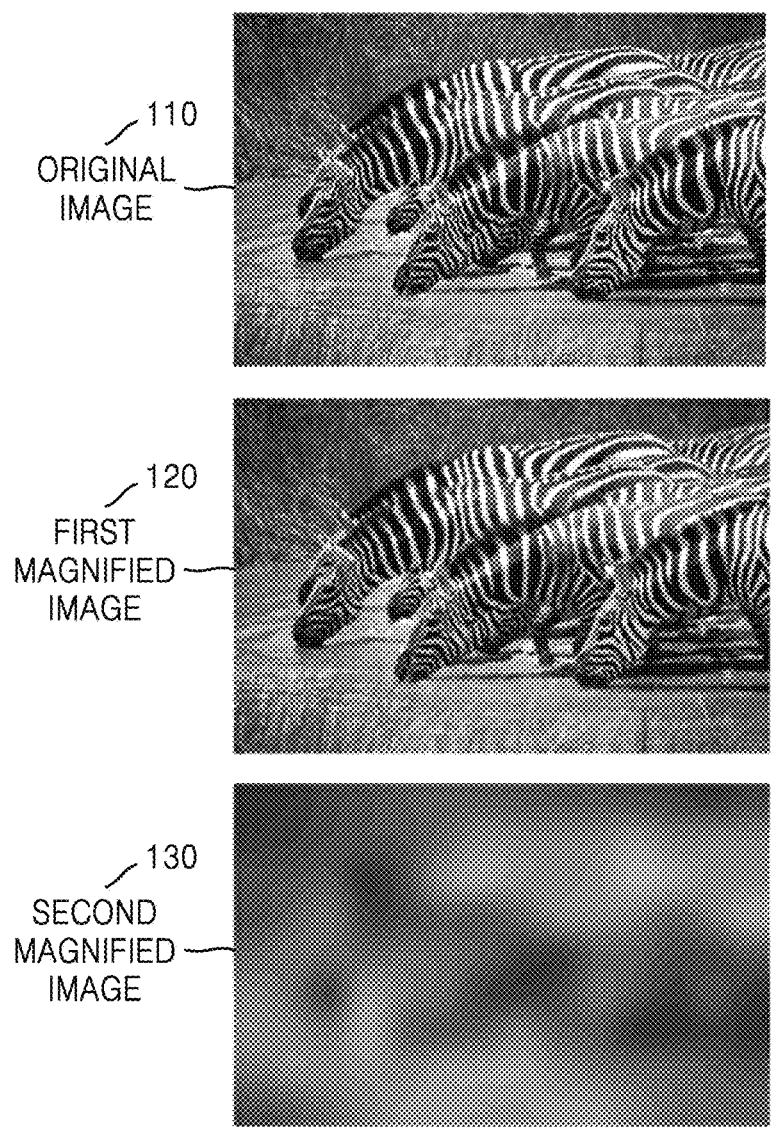
FIG. 1 is a view for explaining generation of a blur in an image when a size of the image is increased.

Embodiments of the disclosure are described in detail herein with reference to the accompanying drawings so that this disclosure may be easily performed by one of ordinary skill in the art to which the disclosure pertains. The disclosure may, however, be embodied in many different forms and should not be construed as being limited to the examples set forth herein.

Although general terms widely used at present were selected for describing the disclosure in consideration of the functions thereof, these general terms may vary according to intentions of one of ordinary skill in the art, case precedents, the advent of new technologies, and the like. Hence, the terms must be defined based on their meanings and the contents of the entire specification, not by simply stating the terms.

The terms used in the present specification are merely used to describe particular embodiments, and are not intended to limit the scope of the disclosure.

Throughout the specification, when an element is referred to as being "connected" or "coupled" to another element, it may be directly connected or coupled to the other element, or may be electrically connected or coupled to the other element with intervening elements interposed therebetween.

The use of the terms "a" and "an" and "the" and similar referents in the context of describing the disclosure (especially in the context of the following claims) are to be construed to cover both the singular and the plural. Also, the steps of all methods described herein may be performed in any suitable order unless otherwise indicated herein or otherwise clearly contradicted by context. Embodiments of the disclosure are not limited to the described order of the operations.

Thus, the expression "according to an embodiment" used in the entire disclosure does not necessarily indicate the same embodiment.

Embodiments of the disclosure may be described in terms of functional block components and various processing steps. Some or all of such functional blocks may be realized by any number of hardware and/or software components configured to perform the specified functions. For example, functional blocks according to the disclosure may be realized by one or more microprocessors or by circuit components for a predetermined function. In addition, for example, functional blocks according to the disclosure may be implemented with any programming or scripting language. The functional blocks may be implemented in algorithms that are executed on one or more processors. Furthermore, the disclosure described herein could employ any number of conventional techniques for electronics configuration, signal processing and/or control, data processing and the like. The words "mechanism," "element," "means," and "configuration" are used broadly and are not limited to mechanical or physical embodiments.

Furthermore, the connecting lines or connectors between components shown in the various figures presented are intended to represent exemplary functional relationships and/or physical or logical couplings between the components. Connections between components may be represented by many alternative or additional functional relationships, physical connections or logical connections in a practical device.

The terms "unit", "-er (-or)", and "module" when used in this specification refers to a unit in which at least one function or operation is performed, and may be implemented as hardware, software, or a combination of hardware and software.

Throughout the disclosure, the expression "at least one of a, b or c" indicates only a, only b, only c, both a and b, both a and c, both b and c, all of a, b, and c, or variations thereof.

The term "user" used herein denotes a person who controls a function or operation of an image display apparatus by using the image display apparatus. Examples of the user may include a viewer, a manager, or an installation engineer.

The disclosure will now be described more fully with reference to the accompanying drawings, in which exemplary embodiments are shown.

FIG. 1 is a view for explaining generation of a blur in an image when a size of the image is increased. With enlargement of the size of a display panel (not shown), an image that is generally output by a relatively small-sized image display apparatus (not shown) may be output by a large-sized display panel. For example, when an image display apparatus has an output resolution of high definition (HD) or full HD and a large-sized display panel has a high resolution of ultra HD, 8K ultra HD, or the like, an image is magnified to increase its size so that a low-resolution image output by the image display apparatus is output on the large-sized display panel having a high resolution. In this case, the image output on the large-sized display panel has a lower definition than the original image.

When the image display apparatus outputs a plurality of images and one of the plurality of images is selected by a user, the image display apparatus generally outputs the received plurality of images as they are, without adjusting and outputting resolutions of the plurality of images. For example, when the image display apparatus receives a content selection screen from a content provider (not shown) and outputs the same, the image display apparatus outputs a thumbnail and the like of content provided by the content provider on a screen without changes. This may not cause any problem the resolution of the content received from the content provider is equal to or insignificantly different from the output resolution of a display panel. However, when the resolution of the content received from the content provider is greatly different from the output resolution of the display panel, content output by the display panel is not clear and appears vaguely.

Referring to FIG. 1, an original image 110 is displayed clearly and a boundary portion of an object is displayed precisely.

In FIG. 1, a first magnified image 120 is obtained by magnifying the original image 110 five times. When the original image 110 is magnified, the number of pixels increases, and thus a blank is generated in the pixels, and a magnified image is generated by interpolating the pixels by using a neighboring image. The magnified image has a blur due to generation of loss at a high frequency area, in particular, an edge portion of an object. In FIG. 1, the first magnified image 120 is slightly vaguely seen compared with the original image 110.

In FIG. 1, a second magnified image 130 is obtained by magnifying the original image 110 one hundred times. When compared with the original image 110 and the first magnified image 120, the second magnified image 130 is much blurry that the area of the object is unable to be identified.

Figure 2:
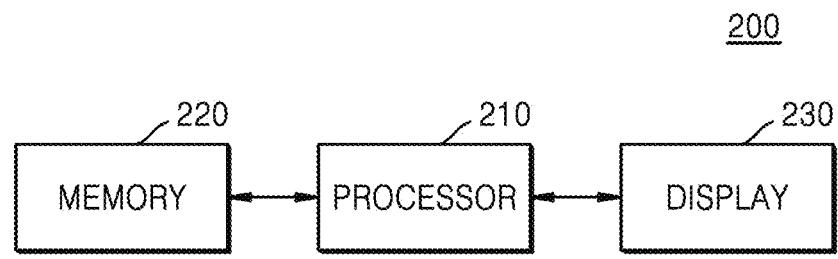
FIG. 2 is a block diagram of an internal structure of an image display apparatus according to an embodiment.

FIG. 2 is a block diagram of an internal structure of an image display apparatus 200 according to an embodiment. Referring to FIG. 2, the image display apparatus 200 may include a processor 210, a memory 220, and a display 230.

The image display apparatus 200 according to an embodiment may be an electronic apparatus capable of processing and outputting an image. The image display apparatus 200 may be fixed or movable. The image display apparatus 200 may be implemented using, for example but not limited to, a digital television (TV). The image display apparatus 200 may be implemented using various types of TVs such as a three-dimensional (3D)-TV, a smart TV, a light-emitting diode (LED) TV, an organic light-emitting diode (OLED) TV, and a plasma TV. The image display apparatus 200 may also be, but is not limited to, at least one of a desktop personal computer (PC), a smartphone, a tablet PC, a mobile phone, a video phone, an e-book reader, a laptop PC, a netbook computer, a digital camera, a personal digital assistant (PDAs), a portable multimedia player (PMP), a camcorder, a navigation device, a wearable device, a smart watch, a home network system, a security system, a medical device or any device capable of outputting an image.

The memory 220 according to an embodiment may store one or more instructions. The memory 220 may store one or more programs executable by the processor 210. The memory 220 may store data that is input to the image display apparatus 200 and/or output by the image display apparatus 200.

The memory 220 may store various programs and data for improving the resolution of the image, which are input to the image display apparatus 200. The memory 220 may store at least one of a filter or a model that is used by the image display apparatus 200 to perform image restoration.

The memory 220 may include, for example, at least one type of a storage medium from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), a magnetic memory, a magnetic disk, and an optical disk.

The processor 210 according to an embodiment controls operations of the image display apparatus 200. The processor 210 may control operations of the image display apparatus 200 by executing the one or more programs stored in the memory 220.

According to an embodiment, the processor 210 may transform an image into a frequency domain and estimate a blur level of the image in the frequency domain, by executing the one or more programs stored in the memory 220. It may be difficult to estimate the blur level of the image in a spatial domain. Thus, according to an embodiment, the processor 210 may transform the image into the frequency domain and may estimate the blur level of the image in the frequency domain, based on a rule by using a power spectrum of the image.

According to an embodiment, even when the processor 210 does not have information about how many times an image to be output has been upscaled compared with the original image or how much a resolution value of the image to be output has been changed compared with the original image, the processor 210 may estimate the blur level and may improve the resolution of the image by using the estimated blur level.

According to an embodiment, the processor 210 may adjust the resolution of the image in the spatial domain by using the estimated blur level of the image. When the image is restored in the frequency domain rather than in the spatial domain, the number of resources and calculations needed to restore the image increase. Furthermore, because a signal in the frequency domain has an amplitude and a phase, signal processing in the frequency domain is complicated and difficult, and the quality of an image may be degraded in a process of restoring the image in the frequency domain and then transforming the image back into the spatial domain. Therefore, according to an embodiment, the processor 210 may estimate the blur level of the image in the frequency domain, and may restore the image in the spatial domain by using the estimated blur level.

According to an embodiment, the processor 210 may divide the image into a plurality of sub-areas and estimate a blur level of each of the plurality of sub-areas to adjust a resolution of each of the plurality of sub-areas.

According to an embodiment, the processor 210 may determine whether to improve an image resolution, according to whether the estimated blur level is greater than a threshold value. For example, when an estimated blur level of a certain image is less than a predetermined reference value, the processor 210 may output the image without improving the resolution of the image. For example, when image restoration is performed on the image even when the image has a resolution conforming to the output resolution of the display 230, a restored image may be seen artificially compared with the original image. Accordingly, the processor 210 may perform image restoration with respect to the image only when the blur level of the image is high, namely, equal to or greater than the predetermined reference value, based on the estimated blur level.

According to an embodiment, when the processor 210 divides the image into a plurality of sub-areas and estimates respective blur levels of the plurality of sub-areas, the processor 210 may adjust the resolution of only a sub-area having an estimated blur level equal to or greater than the predetermined reference value from among the plurality of sub-areas. The processor 210 may omit resolution adjustment with respect to a sub-area having an estimated blur level that is less than the predetermined reference value.

According to an embodiment, the processor 210 may perform image restoration by using the estimated blur level. The processor 210 may select a filter or model suitable for image restoration, design the filter or model suitable for image restoration, and/or correct and use a pre-designed filter or model, based on the estimated blur level. For example, the processor 210 may change a value of a hyperparameter of an image restoration model or filter.

The processor 210 may improve the resolution of the image by using an image restoration model or filter that is selected or designed according to the estimated blur level or by using a model or filter obtained by changing a value of a hyperparameter of a pre-designed model or filter.

According to an embodiment, when the processor 210 divides the image into a plurality of sub-areas and estimates respective blur levels of the plurality of sub-areas, the processor 210 may improve the resolution of each of the plurality of sub-areas, based on the respective estimated blur levels of the plurality of sub-areas. The processor 210 may improve the resolution of each of sub-areas having estimated blur levels exceeding the predetermined reference value, according to independent methods, based on the estimated blur level of each of the plurality of sub-areas. In FIG. 2, the display 230 may output an image such as a drawing or a photo, a video signal, a text signal, or the like. According to an embodiment, the display 230 may output, to a user, a new image having improved resolution, which is obtained by the processor 210 that performs image restoration. The display 230 may output, to the user, an image without improved resolution when the image is determined by the processor 210 as having the estimated blur level that is lower than the predetermined reference value.

According to an embodiment, when the processor 210 divides the image into the plurality of sub-areas, estimates respective blur levels of the plurality of sub-areas, and adjusts respective resolutions of at least one of the plurality of sub-areas, the processor 210 may obtain a new image including at least one sub-area of which resolution has been adjusted. The new image may include one or more sub-areas of which resolutions have been adjusted, and sub-areas of which resolutions have not been adjusted.

The display 230 may output the new image including one or more sub-areas having adjusted resolutions.

When the display 230 is implemented by using a touch screen, the display 230 may be used as an input device as well as an output device.

The display 230 may include, for example but not limited to, at least one of a liquid crystal display (LCD), a thin film transistor-liquid crystal display (TFT-LCD), an organic light-emitting diode (OLED), a flexible display, a three-dimensional (3D) display, or an electrophoretic display.

The display 230 may be implemented by using not only a flat display but also a curved display having a curvature or a flexible display capable of adjusting a curvature. The output resolution of the display 230 may be, for example, an HD, a full HD, an ultra HD, a 8K ultra HD, or a resolution that is clearer than the 8K ultra HD.

As such, according to an embodiment, the image display apparatus 200 may estimate a blur level of an image of which resolution is not known, and may improve the resolution of the image, based on the estimated blur level.

According to an embodiment, the image display apparatus 200 may estimate the blur level of the image in the frequency domain, and may improve the resolution of the image in the spatial domain by using a model or filter conforming to the blur level of the image.

Figure 3:
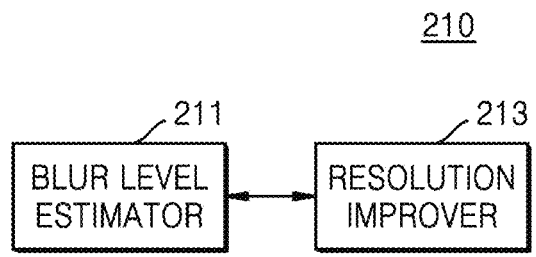
FIG. 3 is a block diagram of an internal structure of a processor according to an embodiment.

FIG. 3 is a block diagram of an internal structure of the processor 210 according to an embodiment. Referring to FIG. 3, the processor 210 may include a blur level estimator 211 and a resolution improver 213.

Humans may identify whether an image is clear or vague in the spatial domain, and how much the image is vague, with their eyes, but it may be difficult for the image display apparatus 200 to estimate the blur level of the image in the spatial domain. In other words, because the image display apparatus 200 needs a reference target to make a comparison and a determination in order to estimate the blur level of the image, the image display apparatus 200 has difficulties in determining the blur level of the image on the spatial domain.

According to an embodiment, the blur level estimator 211 may transform an image into a frequency domain and estimate a blur level of the image in the frequency domain. To this end, the blur level estimator 211 may perform a fast Fourier transform (FFT) on the image.

The image is a discrete signal rather than a continuous signal, and is a signal defined in a limited finite section. Assuming that the image is a signal f(x, y) having a size of a width (W)×a height (H), the blur level estimator 211 may obtain F(u, v) by performing a discrete Fourier transform on the image. The discrete Fourier transform refers to a Fourier transform defined for discrete data. F(u, v) is the coefficient of a periodic function component having a frequency u in an x-axis direction and a frequency v in a y-axis direction. The blur level estimator 211 may decompose and express the image as a sum of various two-dimensional (2D) sine waves by performing a Fourier transform on the image.

The blur level estimator 211 may obtain a power spectrum from F(u, v) obtained via the Fourier transform. The blur level estimator 211 may estimate the blur level of the image by using the power spectrum.

The power spectrum obtained by the blur level estimator 211 will now be described with reference to FIG. 4.

Figure 4:
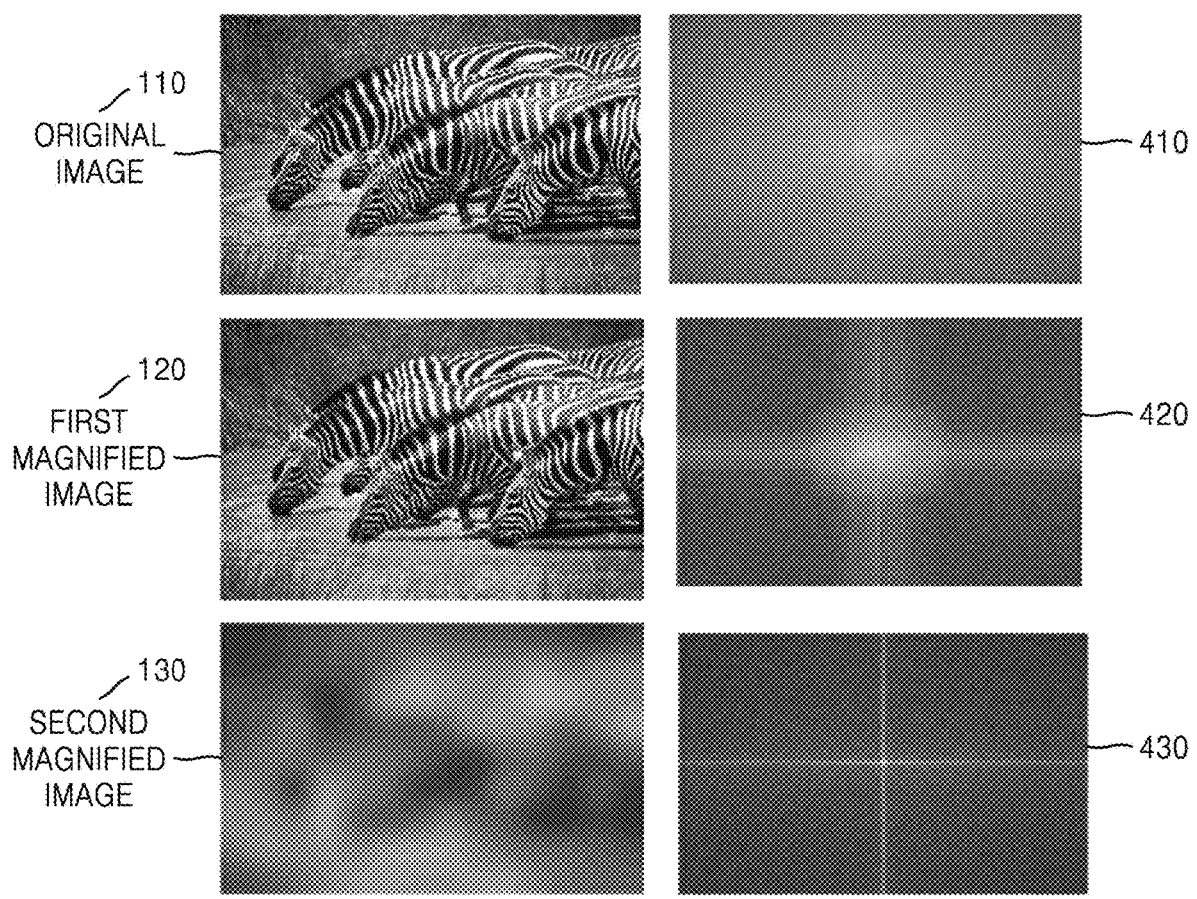
FIG. 4 is a view illustrating power spectra obtained with respect to images by a blur level estimator in the frequency domain, according to an embodiment.

FIG. 4 is a view illustrating power spectra obtained with respect to images by the blur level estimator 211 in the frequency domain, according to an embodiment. Images 110, 120, 130 in the spatial domain are shown on the left side of FIG. 4, and power spectra 410, 420, 430 respectively corresponding to the images 110, 120, 130 are shown on the right side of FIG. 4.

The original image 110, the first magnified image 120, and the second magnified image 130 are sequentially illustrated from the top on the left side of FIG. 4./in FIG. 4, the original image 110 is displayed clearly and the boundary portion of the object is displayed delicately, whereas the first magnified image 120 is obtained by magnifying the original image 110 five times and is more blurry than the original image 110 due to occurrence of loss at an edge portion of the object. The second magnified image 130 is obtained by magnifying the original image 110 one hundred times, and a blur level thereof is excessively large such that a region of the object cannot be identified.

Given that the original image 110 is a signal f(x, y) having a W×H size, the blur level estimator 211 according to an embodiment may obtain the signal F(u, v) of the frequency domain by performing a Fourier transform on the original image 110. The signal F(u, v) is a complex number, and is thus composed of a real part and an imaginary part. The blur level estimator 211 may obtain a size |F(u, v)| of the complex number F(u, v) from the power spectrum. In F(u, v), u=0, . . . , W−1, and v=0, . . . , H−1, and thus, when |F(u, v)| is given as a pixel value, the power spectrum may be visualized as an image having the same size as the original image.

The power spectrum represents how strongly a corresponding frequency component is included in the original image. In general, because a low frequency region of the power spectrum has a very large value, whereas most of other regions of the power spectrum have values approximating to 0, an image may be expressed based on a log value of the power spectrum. Because the original power spectrum image has a larger value toward the edge, it is difficult to ascertain the shape of the power spectrum, and thus an image in which a spectrum is shifted such that its origin is at the center may be generated as a power spectrum image.

The blur level estimator 211 may obtain a power spectrum with respect to each of the images on the left side of FIG. 4. As shown on the right side of FIG. 4, a power spectrum 410 of the original image 110 is of a different type from power spectra 420 and 430 respectively corresponding to the first magnified image 120 and the second magnified image 130.

In other words, it can be seen that, in the power spectrum 410 of the original image 110, a power value of the entire image region does not suddenly change and the entire image region is filled smoothly. However, it can be seen that images in the power spectra 420 and 430 of the first and second magnified images 120 and 130 are blurry and the power spectra 420 and 430 concentrate on specific regions based on the centers thereof. It can also be seen in FIG. 4 that the power spectrum 430 of the second magnified image 130 has higher concentrativeness based on the center than the power spectrum 420 of the first magnified image 120. A power spectrum having high concentrativeness may refer to a power value suddenly changing over the image.

According to an embodiment, the blur level estimator 211 may obtain a spectral envelope from the power spectrum. The spectral envelope will now be described with reference to FIGS. 5 and 6.

Figure 5:
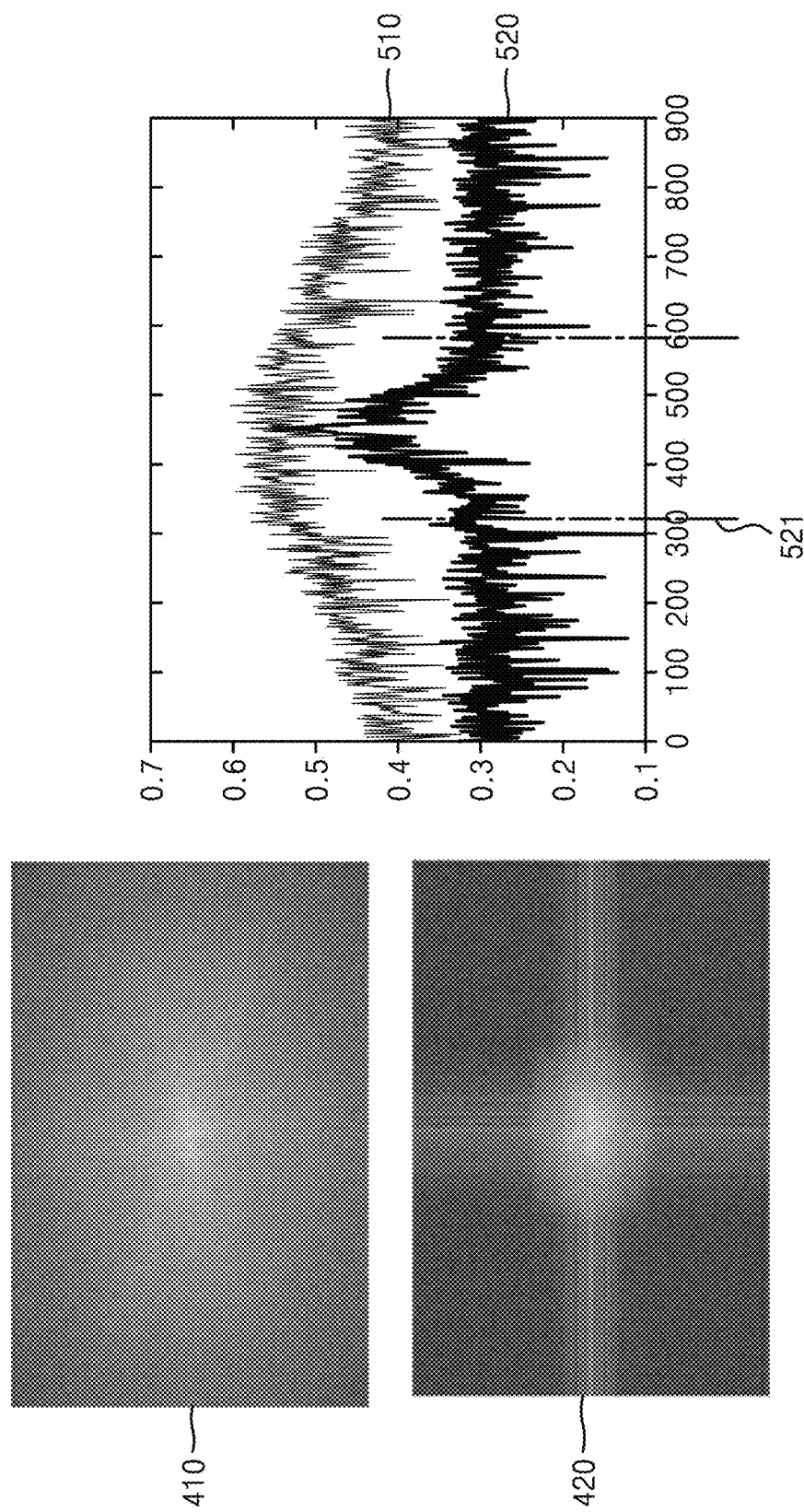
FIG. 5 illustrates a spectral envelope obtained from a power spectrum by the blur level estimator, according to an embodiment.

FIG. 5 illustrates a spectral envelope obtained from a power spectrum by the blur level estimator 211, according to an embodiment. Referring to FIG. 5, the power spectrum 410 of the original image 110 and the power spectrum 420 of the first magnified image 120 are shown on the left side, and the graph on the right side shows power envelopes 510 and 520 respectively obtained from the power spectra 410 and 420. In the graph on the right side of FIG. 5, the x axis indicates a bin index value, and the y axis indicates a frequency obtained by taking log after normalizing the absolute value of a signal.

According to an embodiment, the blur level estimator 211 may select a column or a row passing through the center of a power spectrum or a column or a row located within a predetermined distance from the center of the power spectrum, and may obtain a spectral envelope for the selected column or row. The spectral envelope is a line that connects a power spectrum value from a lower frequency to a high frequency, and displays frequency characteristics of a region of interest.

According to an embodiment, the blur level estimator 211 may select a plurality of columns and/or rows rather than one column and/or row from the power spectrum, and may use an average value of the spectral envelopes obtained for the selected columns and/or rows.

The original spectral envelope 510 on the right side of FIG. 5 is a plot obtained from the power spectrum 410 of the original image 110, and the first spectral envelope 520 is a plot obtained from the power spectrum 420 of the first magnified image 120. As shown in FIG. 5, the original spectral envelope 510 and the first spectral envelope 520 have different inclinations. In other words, the original spectral envelope 510 has a gentle inclination, whereas the first spectral envelope 520 includes a section having a flat inclination and a section having a suddenly-changing inclination. In an example embodiment, an inclination that is equal to or greater than a threshold may be determined as the suddenly-changing inclination.

According to an embodiment, the blur level estimator 211 may estimate the blur level of the first magnified image 120 by using the first spectral envelope 520.

According to an embodiment, the blur level estimator 211 may estimate the blur level by using the inclination of the spectral envelope, based on the fact that, statistically, when the inclination of the spectral envelope has a suddenly-changing section, there is a blurred area in a corresponding image According to an embodiment, the blur level estimator 211 may obtain a bin index value 521 of a point where the inclination of the envelope 520 suddenly changes, and may estimate the blur level of the first magnified image 120 from the obtained bin index value 521.

Alternatively, the blur level estimator 211 may estimate the blur level of the first magnified image 120 according to an inclination value of the plot at a section where the inclination of the envelope 520 suddenly changes.

Alternatively, the blur level estimator 211 may estimate the blur level according to a ratio between the section where the inclination of the envelope 520 is gentle and the section where the inclination of the envelope 520 suddenly changes.

As such, according to an embodiment, the blur level estimator 211 may estimate the blur level of the image, based on a rule, by using the plot shape of a spectral envelope.

Figure 6:
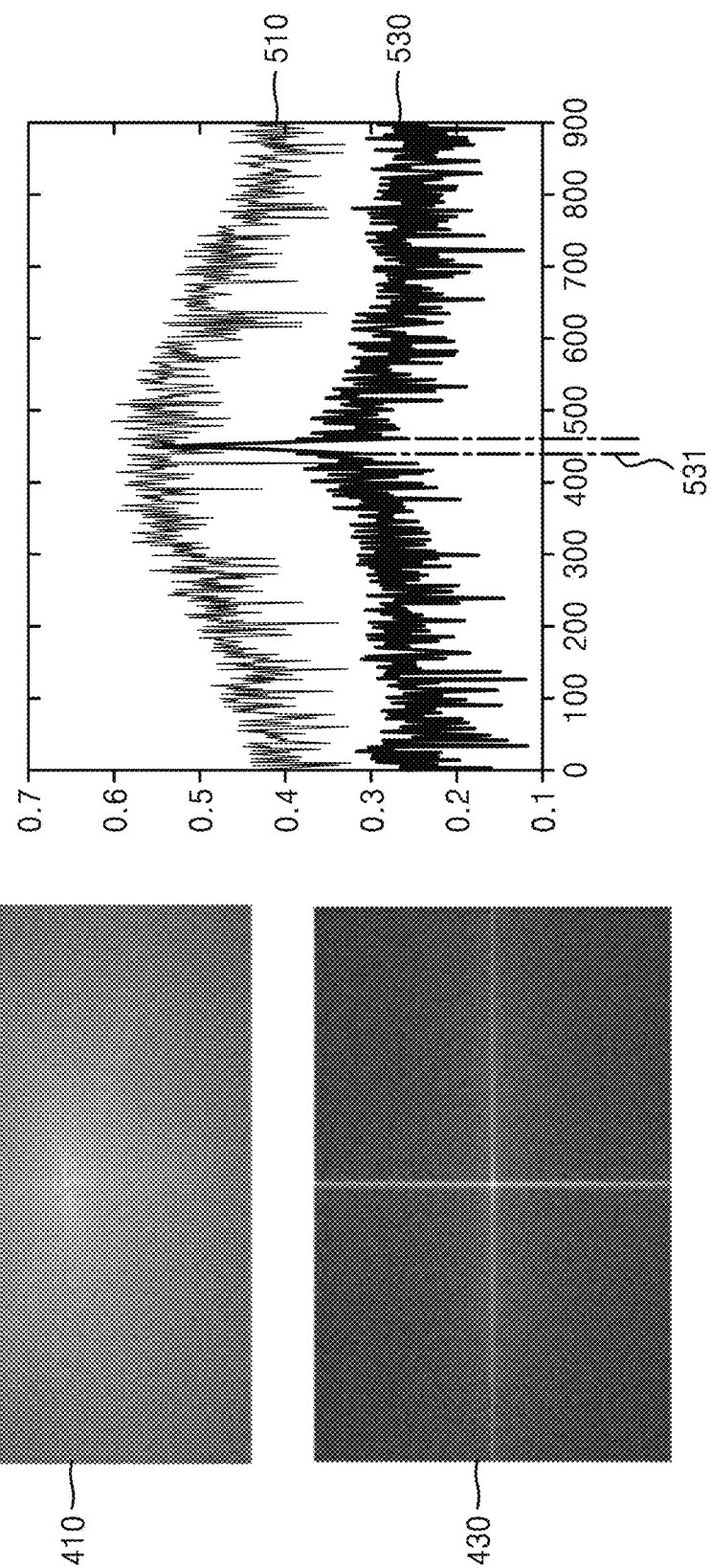
FIG. 6 illustrates a spectral envelope obtained from a power spectrum by the blur level estimator, according to an embodiment.

FIG. 6 illustrates a spectral envelope obtained from a power spectrum by the blur level estimator 211, according to an embodiment. Referring to FIG. 6, the power spectrum 410 of the original image 110 and the power spectrum 430 of the second magnified image 130 are shown on the left side, and the graph on the right side shows power envelopes 510 and 530 respectively obtained from the power spectra 410 and 430. In the graph on the right side of FIG. 6, the x axis indicates a bin index value, and the y axis indicates a frequency.

Similar to FIG. 5, the blur level estimator 211 may select a column or a row passing through the center of a power spectrum or the vicinity of the center of the power spectrum, and may obtain a spectral envelope for the selected column or row.

One of the two plots shown on the right side of FIG. 6 is the original spectral envelope 510 obtained from the power spectrum 410 of the original image 110, and the other plot is the second spectral envelope 530 obtained from the power spectrum 430 of the second magnified image 130. As shown in FIG. 6, the original spectral envelope 510 has a gentle inclination, whereas the second spectral envelope 530 includes a section having a flat inclination and a section having a suddenly-changing inclination. A section of the second spectral envelope 530 has a greatly sharp inclination compared with the original spectral envelope 510.

According to an embodiment, the blur level estimator 211 may estimate the blur level of the image by using a degree to which the inclination of the spectral envelope is steep. For example, the blur level estimator 211 may determine that the blur level of the image increases, based on an increase in the degree of the inclination of the spectral envelope, and determine that the second magnified image 130 has a higher blur level than the first magnified image 120, based on the second spectral envelope 530 of FIG. 6 of which an inclination is steeper than an inclination of the first spectral envelope 520 of FIG. 5.

According to an embodiment, the blur level estimator 211 may obtain a bin index value 531 of a point where the inclination of the second spectral envelope 530 starts to suddenly change, and may estimate the blur level from the obtained bin index value 531. For example, the blur level estimator 211 may determine that the blur level of the image increases, based on an increase in the bin index value 531 of the point where the inclination of the second spectral envelope 530 starts to suddenly change, by using the fact that the bin index value 531 of the point where the inclination of the second spectral envelope 530 of FIG. 6 suddenly changes is greater than the bin index value 521 of the point where the inclination of the first spectral envelope 520 of FIG. 5 suddenly changes.

As such, the blur level estimator 211 may estimate the blur level by using the spectral envelope in the frequency domain. The blur level estimator 211 may estimate the blur level of the image by using, for example but not limited to, at least one of the inclination value of the spectral envelope, a ratio between a section where the inclination of the spectral envelope is gentle and a section where the inclination of the spectral envelope suddenly changes, or the bin index value at the point where the inclination of the spectral envelope starts to suddenly change.

As such, because the blur level estimator 211 calculates the blur level of the image, based on a rule or statistics, in the frequency domain, the blur level estimator 211 may estimate the blur level of the image with a small number of calculations and at a high speed.

Referring back to FIG. 3, the blur level estimator 211 may transmit the estimated blur level to the resolution improver 213. The resolution improver 213 may receive the estimated blur level from the blur level estimator 211, and may improve the resolution of the image in the spatial domain by using the received estimated blur level.

A large amount of resources are needed to perform image restoration in the frequency domain. Because signal processing is performed using a sine wave having a phase and an amplitude in the frequency domain, a large amount of calculations need to be performed and have a high level of complexity, and a result of the signal processing needs to be inversely transformed back into the spatial domain. Thus, according to an embodiment, the resolution improver 213 may perform image restoration in the spatial domain.

According to an embodiment, the resolution improver 213 may improve the resolution of the image according to various methods, by using the estimated blur level.

According to an embodiment, the resolution improver 213 may improve the resolution of the image by using various image restoration models.

According to an embodiment, the resolution improver 213 may determine how many times an image restoration model is to be repeated and used by using the estimated blur level. The resolution improver 213 may improve the resolution of the image by repeating and using the image restoration model the determined number of times.

According to an embodiment, the resolution improver 213 may improve the resolution of the image by using a learning model using one or more neural networks. The neural network may be a group of algorithms that learn a method of improving the resolution of a certain image input to the neural network, based on an artificial intelligence (AI). For example, the neural network may improve the resolution of an image, based on supervised learning using a certain image as an input value and unsupervised learning of discovering a pattern for restoring an image, by self-learning the type of data related to restoring an image without supervision. For example, the neural network may be trained to learn a method of restoring an image, by using reinforcement learning that uses a feedback regarding whether a result of the image restoration according to learning is correct.

The neural network may perform an operation for inferring and prediction according to the AI technology. The neural network may use a convolution neural network (CNN)-based neural network such as a CNN, a deep convolution neural network (DCNN) or a Capsnet neural network. When a correlation between pieces of information included in an image is local, the CNN-based neural network may introduce the concept of a filter that only illuminates a specific area, and convolute pieces of information included in the filter to generate a new feature map.

The neural network may be, for example, a deep neural network (DNN) that performs an operation through a plurality of layers. When the number of layers is plural according to the number of internal layers that perform an operation, i.e., when the depth of the neural network that performs an operation increases, the neural network may be classified as a DNN. A DNN operation may include a CNN operation and the like.

The resolution improver 213 may implement a data recognition model for restoring an image via the neural network, and may train the implemented data recognition model by using training data.

According to an embodiment, an image restoration model usable by the resolution improver 213 to improve the resolution of the image may be divided into several models according to an image restoration method, the type of a neural network that is used, the type of training data, and the like.

For example, the image restoration model may use a DCNN to increase training data by comparing and learning an original image and an image obtained by reducing the original image by half, and may improve the resolution of the image by again drawing the image through information derived from the training data.

For example, the image restoration model may perform an operation via a DNN, and thus improve the resolution of the image according to a method of analyzing or classifying an input image to recognize one or more objects or images included in the image or a background, a place, or the like appearing in the image and restoring the recognized object by using various pieces of training data.

For example, the image restoration model may use a method based on deep learning and interpolation. When an image is enlarged, by using both an interpolation algorithm that calculates and fills non-existing data in the gap between pixels and a deep learning network that learns patterns by itself using a large number of data and predicts results, the image restoration model may obtain variable data capable of inferring the gap between pixels of an enlarged image and may improve the resolution of the image by filling the gap between the pixels with the obtained variable data.

For example, the image restoration model may analyze a low-resolution image and then restore an image by using both a neural network that connects the low-resolution image to a high-resolution and high-definition image and a neural network that adds details of an image output therefrom. In other words, the neural network performs learning by lowering a resolution of a plurality of high-definition images to a low-resolution image and then connecting the low-resolution image to the high-definition images, generates a new high-definition image from an input image, based on training data, and then adds details of the generated image. To this end, the neural network may learn many high-definition images, classify the plurality of high-definition images according to a class, learn factors or features that constitute an image that belongs to the class, and add a new pixel by using a feature already known for a class to which an up-scaled image belongs when the up-scaled image is input, thereby obtaining a final result.

Various neural network models usable for image restoration have been illustrated and described above, and are merely provided as examples of embodiments of the disclosure. However, a neural network usable in the disclosure is not limited to the above embodiments of the disclosure.

According to an embodiment, the resolution improver 213 may select a neural network conforming to the estimated blur level from among a plurality of neural network models usable to improve the resolution of the image. For example, when there are various image restoration models as described above, the resolution improver 213 may select one from the plurality of image restoration models according to the estimated blur level. The resolution improver 213 may select a neural network capable of restoring a most optimized image from an image having the estimated blur level, and may improve the resolution of the image by using the selected image restoration model.

According to an embodiment, the resolution improver 213 may determine the number of times the image restoration model is to be applied according to the estimated blur level. The resolution improver 213 may improve the resolution of the image by applying the image restoration model to the image the determined number of times.

According to an embodiment, the resolution improver 213 may correct the image restoration model according to the estimated blur level. Correcting the image restoration model may include correcting various values of hyperparameters that are used in the neural network. For example, the resolution improver 213 may change the size of a kernel of the neural network, or change various values of hyperparameters for use in implementing the neural network model, such as a weight value applied to a node, in accordance with the estimated blur level.

According to an embodiment, a hyperparameter that is used in the neural network may include a parameter that is determined in the neural network model. This parameter may be predicted, or may be determined and learned via data.

According to an embodiment, the hyperparameter that is used in the neural network may include a value determined or learned outside a machine learning model. For example, the hyperparameter may include values determined outside a machine learning model when the machine learning model is used, such as a learning rate, C in a support vector machine, a sigma value, and a K value in a k-nearest neighbors (KNN). These hyperparameters may include a filter size or filter coefficient, a kernel size, and weight values of a node, which are determined according to a model configuration.

The resolution improver 213 may set or change values of the hyperparameter according to the blur level. When a value of a hyperparameter is changed, another model may be generated. For example, the resolution improver 213 may select a value of a hyperparameter for optimal algorithm performance by performing an algorithm several times. According to an embodiment, the resolution improver 213 may select and use a model having highest performance from among models including different values of hyperparameters.

The resolution improver 213 may set a value of a hyperparameter or correct a preset value, and may optimally improve the resolution of the image by using an image restoration model having the value of the hyperparameter.

According to an embodiment, the resolution improver 213 may design a filter that is to perform image restoration according to the estimated blur level. For example, the resolution improver 213 may improve the resolution of the image by using a method of designing a band pass filter (BPF) and/or a high pass filter (HPF) having different bandwidths according to blur levels and changing a signal of a high frequency band in the image by using the designed filter. The resolution improver 213 may design a filter suitable for the estimated blur level by setting or changing a value of a hyperparameter such as a size of a filter or a filter coefficient. The resolution improver 213 may improve the resolution of the image by using the designed filter. The filter designing will be described in detail later with reference to FIG. 19.

According to an embodiment, when the estimated blur level is low, for example, when the blur degree of an image is less than or equal to a predetermined reference value, the resolution improver 213 may omit resolution improvement for the image. When a neural network model is applied or filtering is perform with respect to an image even when the image has a high resolution, an image output due to the application or filtering may have a lower quality or may be artificially seen compared with the original image.

According to an embodiment, the resolution improver 213 may omit post processing, namely, resolution improvement, with respect to an image when the estimated blur level of the image is less than or equal to the predetermined reference value, and may immediately output the image via the display 230, thereby preventing execution of unnecessary operations.

As such, according to an embodiment, the resolution improver 213 may select a suitable image restoration model according to the estimated blur level or change a value of a hyperparameter of a model. According to an embodiment, the resolution improver 213 may select or design a suitable filter according to the estimated blur level.

According to an embodiment, the resolution improver 213 may generate an optimal image by restoring the image by using a model or a filter selected or designed according to the estimated blur level.

Figure 7:
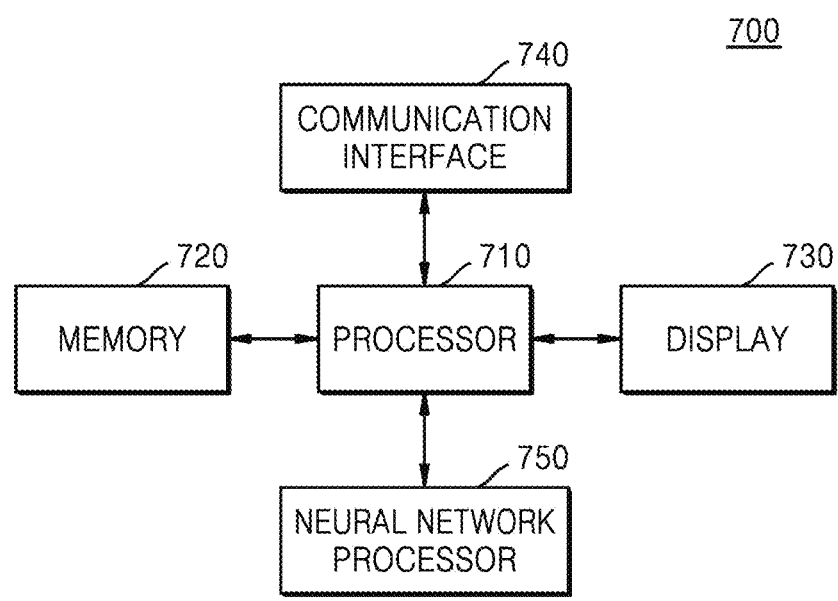
FIG. 7 is a block diagram of an internal structure of an image display apparatus according to an embodiment.

FIG. 7 is a block diagram of an internal structure of an image display apparatus 700 according to an embodiment. Referring to FIG. 7, the image display apparatus 700 may include a communication interface 740 and a neural network processor 750 in addition to a processor 710, a memory 720, and a display 730.

The memory 720 and the display 730 included in the image display apparatus 700 of FIG. 7 are substantially the same as or similar to the memory 220 and the display 230 included in the image display apparatus 200 of FIG. 2. Accordingly, descriptions of matters that are the same as those described above with reference to FIG. 2 will be omitted.

The image display apparatus 700 of FIG. 7 may include the communication interface 740. The communication interface 740 may communicate with an external apparatus (not shown) via a wired and/or wireless network. The communication interface 740 may transmit or receive a signal to or from an external apparatus connected thereto through the wired and/or wireless network under the control of the processor 710. The external apparatus may include a server, a server system, a server-based apparatus, and the like that process data transmitted or received to or from the communication interface 740.

The communication interface 740 may include one or more communication modules. The communication modules may include a communication module capable of performing data transmission or reception through a network according to a communication standard.

According to an embodiment, the communication interface 740 may receive media content such as an image, a video signal, or an audio signal from the external apparatus. In this case, an image received by the communication interface 740 may include an image having a lower resolution than a resolution that may be output by the image display apparatus 700.

According to an embodiment, the image display apparatus 700 of FIG. 7 may further include the neural network processor 750 compared with the image display apparatus 200 of FIG. 2. In other words, compared with the image display apparatus 200 of FIG. 2, the image display apparatus 700 of FIG. 7 may perform an image restoration operation through the neural network processor 750, which is a separate processor from the processor 710, instead of a neural network.

According to an embodiment, the processor 710 may transform an image into a frequency domain and may estimate a blur level in the frequency domain. The processor 710 transmits the estimated blur level to the neural network processor 750. According to an embodiment, when the estimated blur level is less than or equal to a predetermined reference value, the processor 710 may output the image through the display 730 without image processing (that is, without the image restoration operation), without transmitting the estimated blur level of the image to the neural network processor 750.

According to an embodiment, the neural network processor 750 may perform an image restoration operation through the neural network by executing one or more instructions stored in the memory 720 or in a memory (not shown) inside the neural network processor 750).

According to an embodiment, the neural network processor 750 may determine the blur degree of the image by using the estimated blur level received from the processor 710, and may select an optimal model conforming to a blur of the image from among a plurality of models, based on the blur degree. Alternatively, the neural network processor 750 may correct a value of a hyperparameter of the model in accordance with the blur level.

The neural network processor 750 may improve the resolution of the image by using a learning model using a selected optimal neural network or a learning model using one or more neural networks of which values of hyperparameters have been corrected. The neural network processor 750 may implement a data recognition model for resolution improvement through the neural network, learn the implemented data recognition model by using training data, and analyze or classify an input image by using the learned data recognition model. The neural network processor 750 may restore an optimal image by improving the resolution of the image by performing an operation through a deep neural network.

Figure 8:
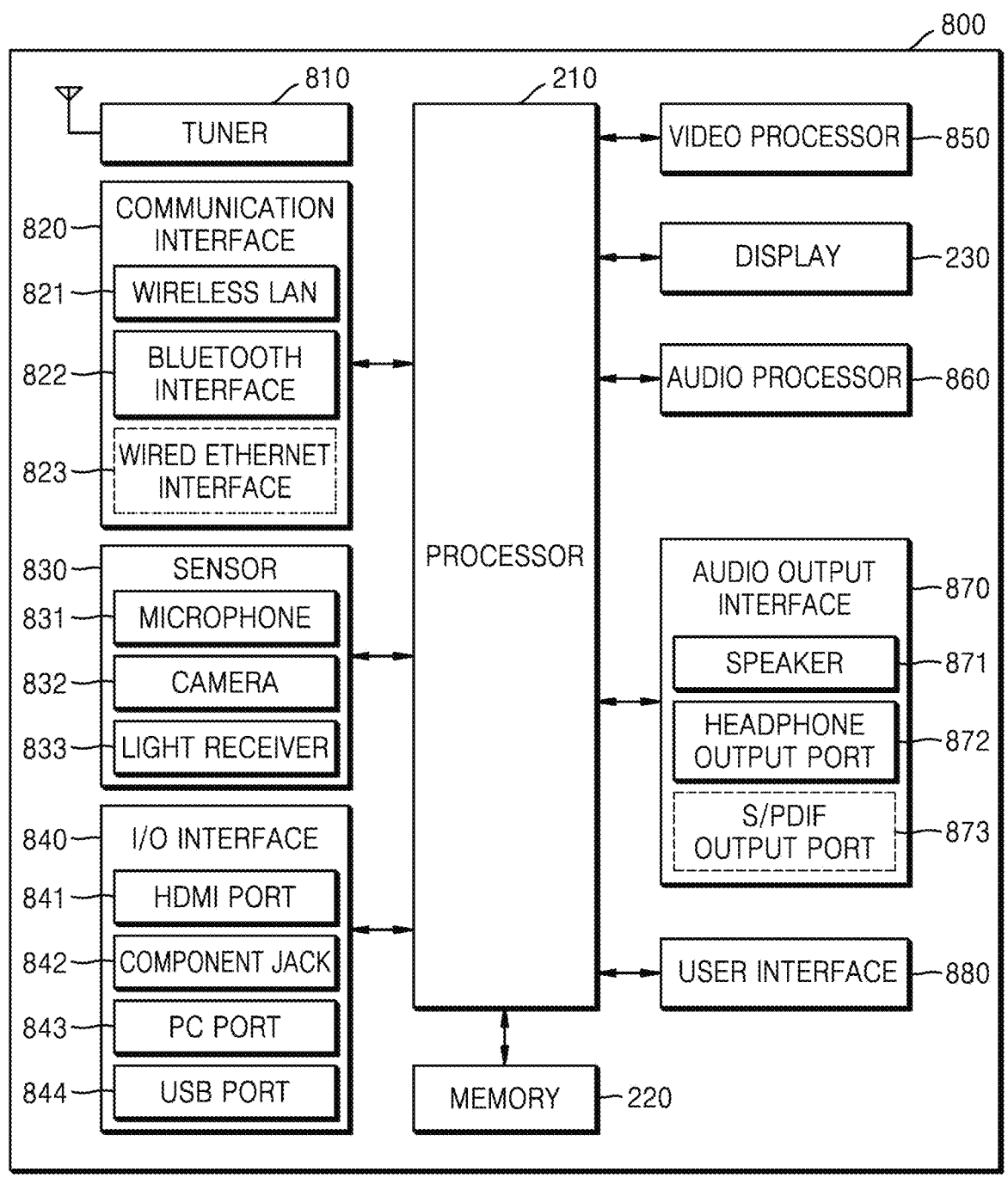
FIG. 8 is a block diagram of an internal structure of an image display apparatus according to an embodiment.

FIG. 8 is a block diagram of an internal structure of an image display apparatus 800 according to an embodiment. Referring to FIG. 8, the image display apparatus 800 may include a tuner 810, a communication interface 820, a sensor 830, an input/output (I/O) interface 840, a video processor 850, an audio processor 860, an audio output interface 870, and a user interface 880, in addition to the processor 210, the memory 220, and the display 230.

The image display apparatus 800 of FIG. 8 may include the components of the image display apparatus 200 of FIG. 2. Accordingly, with regard to the processor 210, the memory 220, and the display 230, descriptions of matters that are the same as those described with reference to FIG. 2 will not be repeated.

The tuner 810 may tune and select only a frequency of a channel from which a radio wave component is to be received by the image display apparatus 800 from among a plurality of radio wave components that are obtained via amplification, mixing, resonance, or the like of wired or wireless broadcasting content. The content received via the tuner 810 is decoded and divided into audio, video, and/or additional information. The audio, the video, and/or the additional information may be stored in the memory 220 under the control of the processor 210.

The communication interface 820 may include at least one communication module such as a short-range communication module, a wired communication module, a mobile communication module, a broadcasting reception module, and the like. The at least one communication module refers to a communication module capable of performing data transmission or reception through a network according to a communication standard such as, for example but not limited to, a tuner, Bluetooth, a wireless LAN (WLAN) or Wireless Fidelity (Wi-Fi), a wireless broadband (Wibro), World Interoperability for Microwave Access (Wimax), Code Division Multiple Access (CDMA), or Wideband Code Division Multiple Access (WCDMA).

The communication interface 820 may connect the image display apparatus 800 to an external apparatus or a server under the control of the processor 210. The image display apparatus 800 may download or web-browse a program or application from the external apparatus or the server through the communication interface 820. The communication interface 820 may receive content from the external apparatus.

The communication interface 820 may include a wireless local area network (LAN) 821, a Bluetooth interface 822, and/or a wired Ethernet interface 823 in correspondence to a performance and a structure of the image display apparatus 800. The communication interface 820 may include any combination of the wireless LAN 821, the Bluetooth interface 822, and the wired Ethernet interface 823. The communication interface 820 may receive a control signal via a control apparatus (not shown) such as a remote controller, under the control of the processor 210. The control signal may be implemented as a Bluetooth signal, a radio frequency (RF) signal, or a Wi-Fi signal. The communication interface 820 may further include short-range communication (for example, near field communication (NFC) or Bluetooth low energy (BLE)), in addition to the Bluetooth interface 822. According to an embodiment, the communication interface 820 may transmit or receive a connection signal to or from the external apparatus or the like through short-range communication such as the Bluetooth interface 822 or BLE.

The sensor 830 senses a voice of a user, an image of the user, or an interaction with the user, and may include, for example, a microphone 831, a camera 832, and a light receiver 833. The microphone 831 may receive an uttered voice of a user, transform the received voice into an electrical signal, and output the electrical signal to the processor 210. The camera 832 may include a sensor (not shown) and a lens (not shown) and may capture an image formed on the screen. The light receiver 833 may receive an optical signal (including a control signal). The light receiver 833 may receive an optical signal corresponding to a user input (for example, touch, pressing, a touch gesture, a voice, or a motion) from the control apparatus (not shown) such as a remote controller or a mobile phone. A control signal may be extracted from the received optical signal under the control of the processor 210.

The I/O interface 840 may receive a video (for example, a moving picture signal or a still image signal), an audio (for example, a voice signal or a music signal), and additional information (for example, a description of content, a content title, and a content storage location) from an apparatus or the like outside the image display apparatus 800 under the control of the processor 210. The I/O interface 840 may include, for example, a High-Definition Multimedia Interface (HDMI) port 841, a component jack 842, a PC port 843, and/or a Universal Serial Bus (USB) port 844. The I/O interface 840 may include any combination of the HDMI port 841, the component jack 842, the PC port 843, and the USB port 844.

The video processor 850 may process image data that is to be displayed by the display 230, and perform a variety of image processing, such as decoding, rendering, scaling, noise filtering, frame rate transformation, and resolution transformation, on the received image data.

The display 230 may output, on the screen thereof, content received from a broadcasting station or received from an external server or an external storage medium. The content is a media signal, and thus may include a video signal, an image, a text signal, and the like. The display 230 may display a video signal or an image received via the HDMI port 841, on the screen thereof. When the display 230 is implemented as a touch screen, the display 230 may be used as an input device as well as an output device. According to embodiments of the image display apparatus 800, the image display apparatus 800 may include two or more displays 230.

According to an embodiment, the processor 210 may estimate the blur level of the image, and may improve the resolution of the image, based on the estimated blur level. The processor 210 may select a model conforming to the estimated blur level from a plurality of image restoration models and may improve the resolution of the image according to the selected model, or may change a value of a hyperparameter of a model and improve the resolution of the image by using a model having the changed value of the hyperparameter. Alternatively, the processor 210 may design a filter having a suitable value of the hyperparameter according to the blur level, and may improve the resolution of the image by using the designed filter.

The display 230 is controlled by the processor 210 to output an image having improved resolution.

The audio processor 860 processes audio data. The audio processor 860 may perform a variety of processing, such as decoding, amplification, or noise filtering, on the audio data.

The audio output interface 870 may output audio included in the content received via the tuner 810, audio that is input via the communication interface 820 or the I/O interface 840, and audio stored in the memory 220, under the control of the processor 210. The audio output interface 870 may include, for example, at least one of a speaker 871, a headphone output port 872, or a Sony/Philips Digital Interface (S/PDIF) output port 873.

The user interface 880 may receive a user input for controlling the image display apparatus 800. The user interface 880 may include, but is not limited to, various types of user input devices including a touch panel that senses a tough of a user, a button that receives a push manipulation of the user, a wheel that receives a rotation manipulation of the user, a key board, a dome switch, a microphone for voice recognition, and a motion detection sensor. When the image display apparatus 800 is manipulated by a remote controller (not shown), the user interface 880 may receive a control signal from the remote controller.

Figure 9:
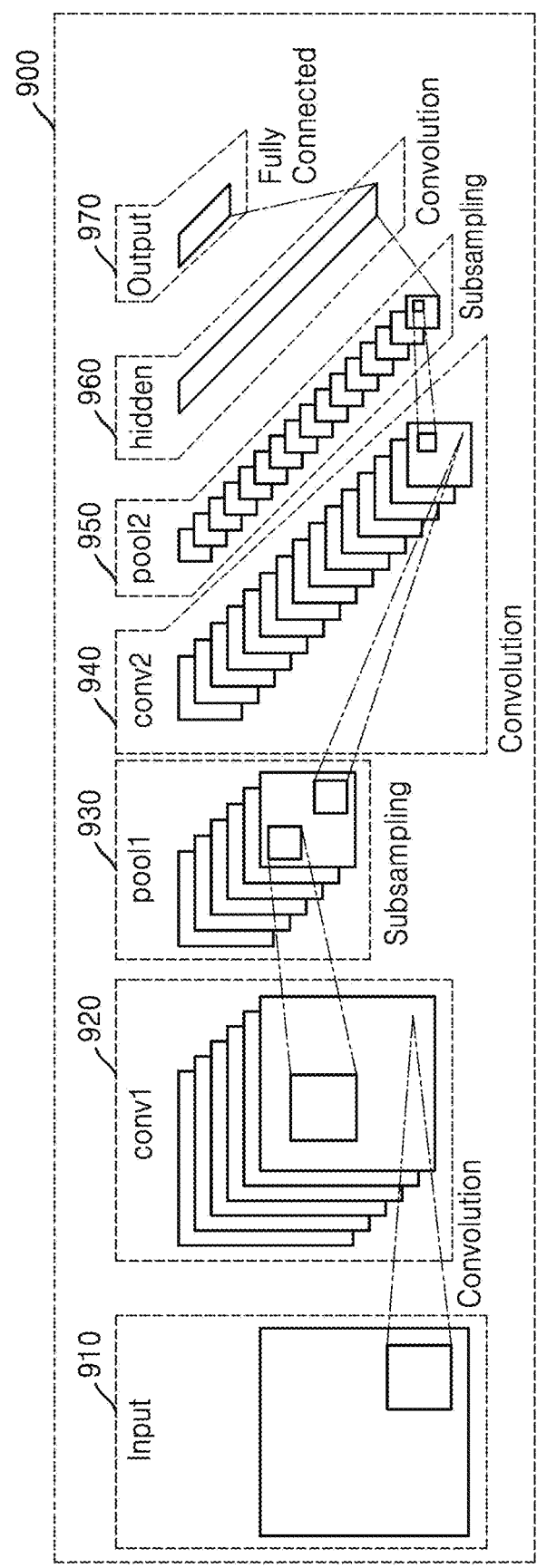
FIG. 9 is a diagram for explaining a neural network that performs image restoration, according to an embodiment.

FIG. 9 is a diagram for explaining a neural network that performs image restoration, according to an embodiment. FIG. 9 illustrates a neural network that is used in an embodiment.

The processor 210 may generate output data by using a CNN, a DCNN, a Capsnet neural network (not shown), or the like. The DCNN and the Capsnet neural network may be CNN-based networks.

When a correlation between pieces of information included in an image is local, the CNN-based neural network may introduce the concept of a filter that only illuminates a specific area, and convolute the pieces of information included in the filter to generate output data.

FIG. 9 illustrates a CNN-based neural network 900. In detail, FIG. 9 illustrates a DCNN 900 having a plurality of depths by including a plurality of layers. The processor 210 may improve the resolution of the image through the CNN-based neural network 900 and output a result of the improvement.

According to an embodiment, an image may be input to an input layer 910 of the CNN-based neural network 900. In the CNN-based neural network 900, convolution layers and pooling layers are arranged alternately with each other, and the depth of each layer filter increases in a direction from the left to the right. A final stage of the CNN-based neural network 900 may be formed of a fully connected layer.

Each convolution layer is a layer of pieces of data generated according to a convolution operation, and each pooling layer is a layer for reducing the number or size of data through a subsampling or pooling operation. Pieces of data (for example, a feature map) representing the features of an input image are generated while passing through the convolution layers and the pooling layers. The pieces of data generated while passing through the convolution layers and the pooling layers may output result data for an image recognized from features through a hidden layer formed of a fully connected layer.

For example, the CNN-based neural network 900 may include an input layer 910, a first convolution layer 920, a first pooling layer 930, a second convolution layer 940, a second pooling layer 950, a hidden layer 960, and an output layer 970.

Each of the plurality of layers that form the CNN-based neural network 900 may include one or more nodes (not shown). For example, the input layer 910 may include one or more nodes that receive data. Because the nodes have weight values, respectively, the CNN-based neural network 900 may obtain output data, based on a value obtained by performing an arithmetic operation, for example, multiplication, with respect to an input signal and each of the weight values.

According to an embodiment, the image display apparatus 200 may change the value of the hyperparameter of the CNN-based neural network 900 by referring to the blur level of the image. For example, the image display apparatus 200 may change the depths of a convolution layer and a pooling layer or change the depth of a hidden layer, according to the blur level. As the depths of the convolution layer and the pooling layer become deeper, more accurate output data may be obtained. However, according to an embodiment, when the depths of the convolution layer and the pooling layer are high even when the estimated blur level is not high, an output image may become unnatural compared with the original image. Thus, according to an embodiment, the depth of the convolution layer or the pooling layer may be determined according to the blur level.

According to an embodiment, the image display apparatus 200 may correct a weight value of one or more of the nodes included in the plurality of layers according to the blur level. Alternatively, the image display apparatus 200 may correct the shape of the CNN-based neural network 900 according to the blur level.

The depth or shape of the CNN-based neural network 900 may be variously designed in consideration of the accuracy of a result, the reliability of the result, and an operation processing speed and a capacity of a processor.

The image display apparatus 200 may perform a convolution operation with respect to an input image by using the CNN-based neural network 900 having a value of a hyperparameter changed based on the blur level.

According to an embodiment, the image display apparatus 200 may set at least one of various values of hyperparameters associated with the CNN-based neural network 900, according to the blur level.

As such, according to an embodiment, the image display apparatus 200 may adjust one or more values from values of hyperparameters of the CNN-based neural network 900 by referring to the blur level of the image, and output a resolution-improved image by using a neural network having the adjusted values of the hyperparameters.

Figure 10:
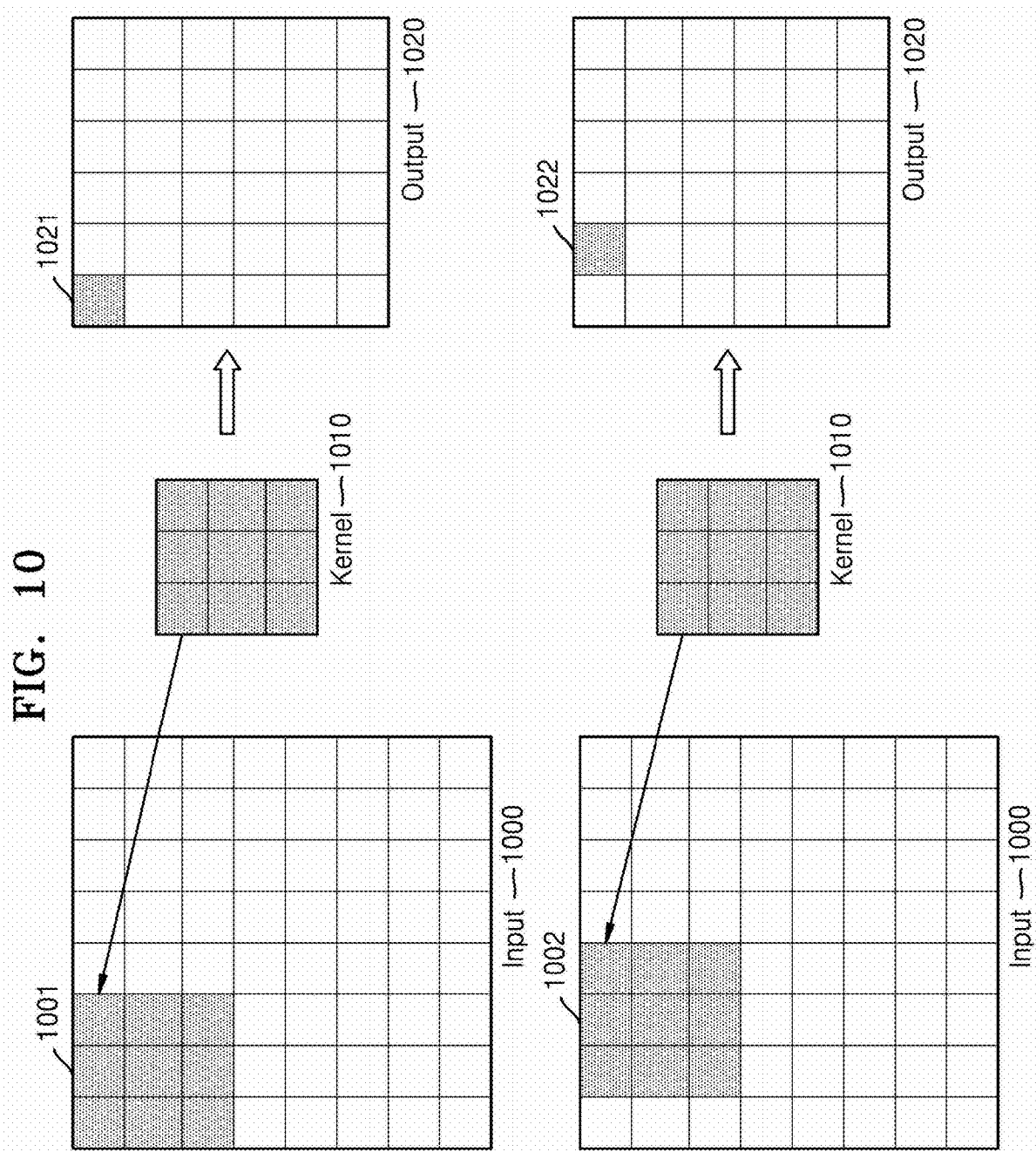
FIG. 10 is a diagram for simplifying and explaining a process in which a neural network performs a convolution operation in a convolution layer, according to an embodiment.

FIG. 10 is a diagram for simplifying and explaining a process in which a neural network performs a convolution operation in a convolution layer, according to an embodiment. Referring to FIG. 10, input data (input) 1000 of the convolution layer is assumed to have a size of 8×8. It is assumed that a size of a kernel applied to the input 1000 is 3×3 (length×width) and the number of kernels is n.

Referring to FIG. 10, the neural network extracts a feature of the input data 1000 by applying a kernel 1010 to a left upper end to a right lower end of the input 1000. The kernel 1010 may refer to a filter or matrix that is applied to the input data 1000. In other words, the kernel 1010 may refer to the number of pixels by which data that is a target of a convolution operation move.

For example, the neural network may perform a convolution operation by applying the kernel 1010 to the pixels included in a left upper end 3×3 region 1001 of the input 1000. The neural network may generate a single pixel value 1021 mapped with the left upper end 3×3 region 1001 by multiplying the pixel values included in the left upper end 3×3 region 1001 by weight values included in the kernel 1010 and summing results of the multiplication.

In addition, the neural network may generate a single pixel value 1022 mapped with a 3×3 region 1002 obtained by shifting the left upper end 3×3 region 1001 of the input 1000 by one pixel rightwards. The neural network may generate the single pixel value 1022 by multiplying the pixel values included in the 3×3 region 1002 by the weight values included in the kernel 1010 and summing results of the multiplication.

Likewise, while the neural network is scanning a target of a convolution operation within the input 1000 in units of pixels in a direction from left to right and from top to bottom, the neural network may generate pixel values by multiplying the pixels by the weight values included in the kernel 1010 and summing results of the multiplication. Thus, a 6×6 feature map (output) 1020 may be output.

According to an embodiment, the image display apparatus 200 may adjust the size of the kernel 1010 by referring to the blur level of the image. With an increase in the kernel size, detailed information of a relatively blurry image may be smoothly configured. However, when a large kernel is applied to an image having a relatively low blur level, namely, a clear image, a restored image may be seen artificially and unpleasantly. According to an embodiment, the image display apparatus 200 may make a kernel have a large size when the blur level is high, and make a kernel have a small size when the blur level is low.

Data of the target of the convolution operation may be scanned while moving the kernel by one pixel at a time, but may be scanned while moving the kernel by two or more pixels at a time. The number of pixels by which input data moves during scanning is referred to as a stride, and the size of a feature map that is output may be determined according to the size of the stride.

According to an embodiment, the image display apparatus 200 may adjust the size of the stride by referring to the blur level of the image.

Referring to FIG. 10, because the input 1000 has a size of 8×8 but the output 1020 has a size of 6×6, the size of the output 1020 is less than that of the input 1000. A convolution neural network includes several convolution layers, and while passing through the several convolution layers, the size of data continuously decreases. When the size of data decreases before a feature is sufficiently extracted, a feature of input data may be lost, and to prevent this, padding may be performed.

Although FIG. 10 illustrates only a result of a convolution operation with respect to the single kernel 1010, when a convolution operation is performed on n kernels, n feature maps may be output. In other words, the number of channels of output data is determined according to the number n of kernels, and accordingly, the number of channels of input data in a next layer may be determined.

As such, according to an embodiment, the image display apparatus 200 may change one or more values of hyperparameters of the neural network, such as a kernel size and a stride size, by referring to the estimated blur level, and may generate an image having an optimally improved resolution by using a neural network having corrected values of the hyperparameters.

Figure 11:
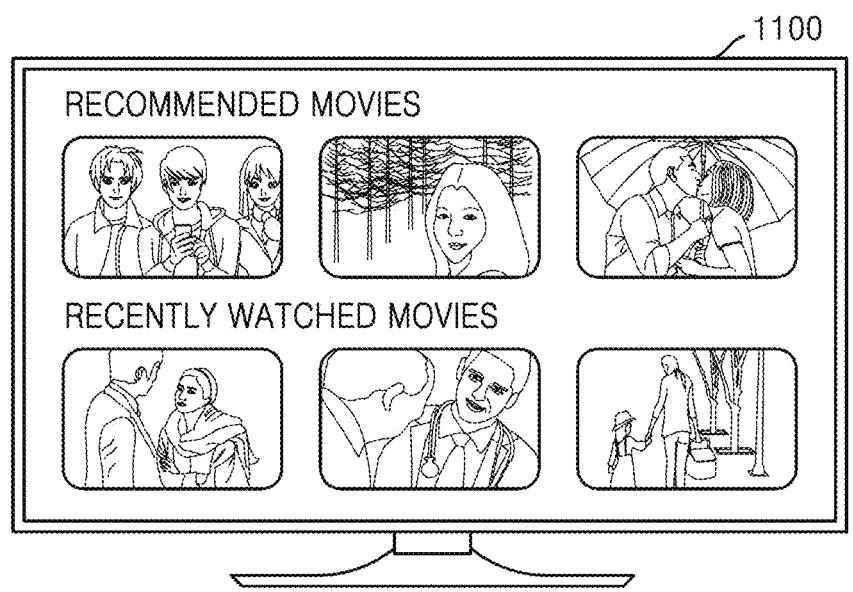
FIG. 11 illustrates a plurality of images output on an image display apparatus according to an embodiment.

FIG. 11 illustrates a plurality of images output on an image display apparatus 1100 according to an embodiment. Referring to FIG. 11, the image display apparatus 1100 may receive content from an external server (not shown) or the like and output the received content on the screen. For example, in FIG. 11, the image display apparatus 1100 may receive content from an external server such as Netflix or Youtube and output the received content. In some cases, the resolution of an image received from the external server may be lower than the resolution of the image display apparatus 1100.

As the image display apparatus 1100 becomes large, the size of an image output on the screen of the image display apparatus 1100 also becomes large. However, when the resolution of the image is lower than a resolution providable by the image display apparatus 1100, the definition of an image output by the image display apparatus 1100 decreases.

When the image display apparatus 1100 knows the resolution of the image received from the external server or the like via a communication network, the image display apparatus 1100 may output an image by correcting the resolution of the received image in accordance with the resolution of the image display apparatus 1100. However, according to an embodiment, when the image display apparatus 1100 does not know the resolution of the image, the image display apparatus 1100 may estimate the resolution of the image, and may improve the resolution of the image by using the estimated resolution.

According to an embodiment, the image display apparatus 1100 may estimate the blur level of an image to be output, in the frequency domain, and may adjust the resolution of the image, based on the estimated blur level. The image display apparatus 1100 may select one of a plurality of models according to the estimated blur level, change a value of at least one hyperparameter of a model, or design a filter having an appropriate hyperparameter, may improve the resolution of the image by using the selected model, the model having a changed value of the at least one hyperparameter, or the designed filter, and may output a resolution-improved image on the screen.

Figure 12:
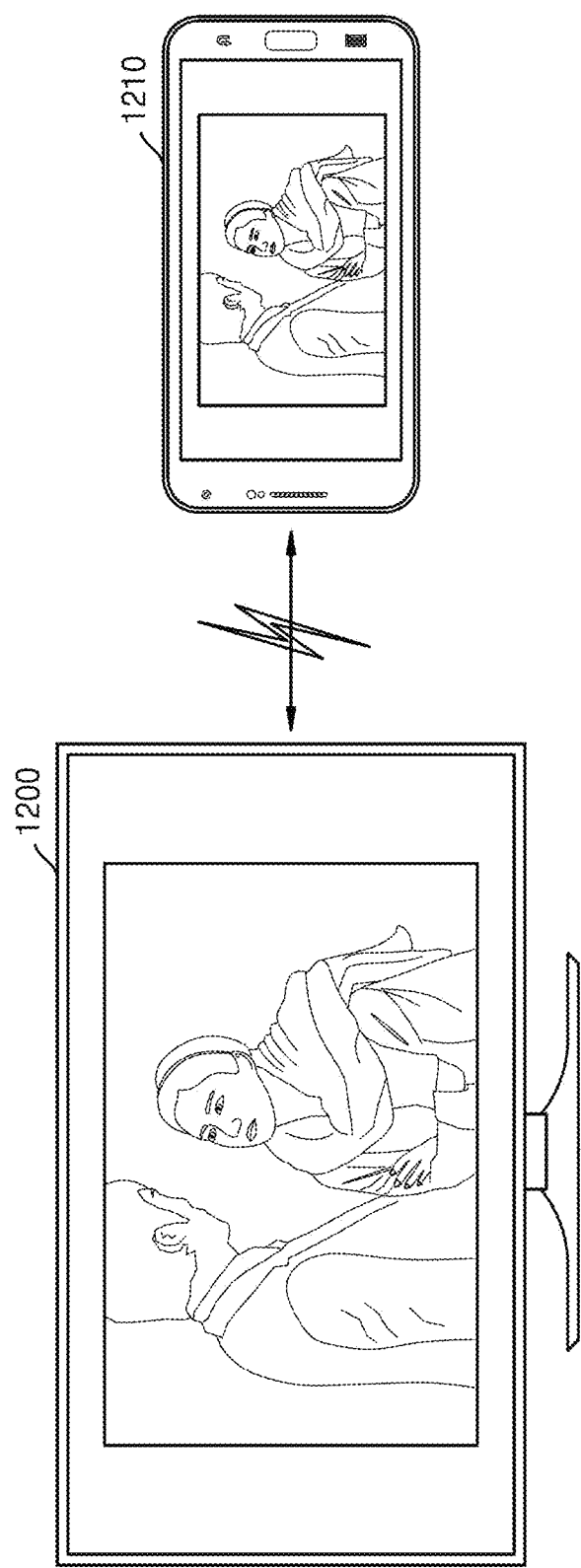
FIG. 12 illustrates outputting of an image received from an external apparatus by an image display apparatus.

FIG. 12 illustrates outputting of an image received from an external apparatus 1210 by an image display apparatus 1200. Referring to FIG. 12, the image display apparatus 1200 may communicate with the external apparatus 1210 through a communication network in a wired or wireless manner.

The external apparatus 1210 may be any of various types of electronic apparatuses capable of generating, capturing, and/or editing an image.

According to an embodiment, it is assumed that the external apparatus 1210 is a mobile terminal. The mobile terminal may generate an image by photographing a subject through a camera or the like included in the mobile terminal. Alternatively, the mobile terminal may receive an image from another mobile terminal or another external apparatus through an application or the like included in the mobile terminal and may store the received image.

The mobile terminal may transmit the stored image to the image display apparatus 1200 via the communication network. The image display apparatus 1200 may output the output received from the mobile terminal on the screen.

In general, human's eyes may not distinguish a resolution of a UHD level or greater in a mobile terminal. When the resolution of the mobile terminal is high, a heat-generation problem, a battery problem, a speed problem, or the like occurs, and thus a RAM capacity, a battery capacity, or the like is consumed. Accordingly, the image display apparatus 1200 may receive a relatively low resolution image from the mobile terminal and output the image on the image display apparatus 1200. However, when the image display apparatus 1200 having a higher resolution than the mobile terminal outputs an image captured or edited by the mobile terminal, the image may be seen blurredly.

According to an embodiment, the image display apparatus 1200 may output a resolution-improved image by adjusting the resolution of the image received from the mobile terminal or the like. To this end, the image display apparatus 1200 may estimate the blur level of the image and may perform image restoration according to the estimated blur level.

When the blur level of the image is lower than a predetermined reference value, the image display apparatus 1200 may omit execution of a resolution improvement operation with respect to the image and may output the image without changes.

The image display apparatus 1200 may estimate the blur level of the image received from the mobile terminal, and, when the estimated blur level is greater than the predetermined reference value, may remove a blur from the image and then may output a blur-removed image on the screen. The image display apparatus 1200 may perform image restoration by selecting one from a plurality of image restoration models according to the blur level, or repeating and using one image restoration model a predetermined number of times, or using a model in which values of hyperparameters are changed by changing values of hyperparameters of a model. Alternatively, the image display apparatus 1200 may design a filter having suitable values of the hyperparameters, based on the blur level, and may adjust the resolution of the image by using the designed filter.

As in FIG. 12, the image display apparatus 1200 may correct a low-resolution image received from the mobile terminal in accordance with the resolution of the image display apparatus 1200, and may output a corrected image on the screen.

Figure 13:
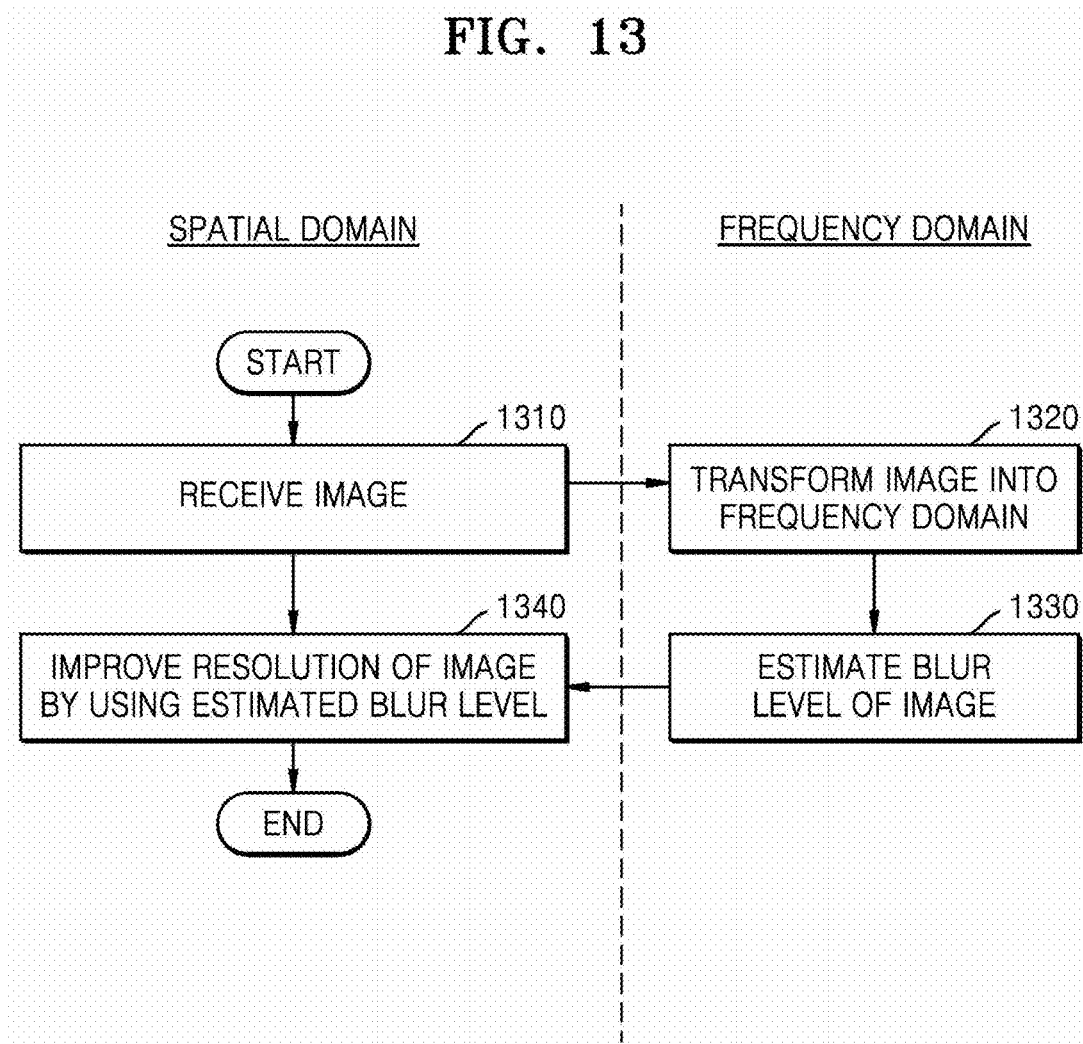
FIG. 13 is a flowchart of an image displaying method according to an embodiment.

FIG. 13 is a flowchart of an image displaying method according to an embodiment. When the image display apparatus 200 receives an image (operation 1310), the image display apparatus 200 may transform the image into a frequency domain (operation 1320). The image display apparatus 200 may transform the image into a signal on the frequency domain by performing a 2D FFT. The image display apparatus 200 may obtain a power spectrum for the signal on the frequency domain, and may obtain a spectral envelope from the power spectrum.

The image display apparatus 200 may estimate a blur level of the image by using, for example, an inclination value of the spectral envelope or a bin index of a point where the inclination of the spectral envelope suddenly changes (operation 1330).

The image display apparatus 200 may improve the resolution of the image received in the spatial domain by using the estimated blur level (operation 1340).

As such, according to an embodiment, the image display apparatus 200 may estimate the blur level of the image in the frequency domain, and may improve the resolution of the image in the spatial domain by using the estimated blur level.

Figure 14:
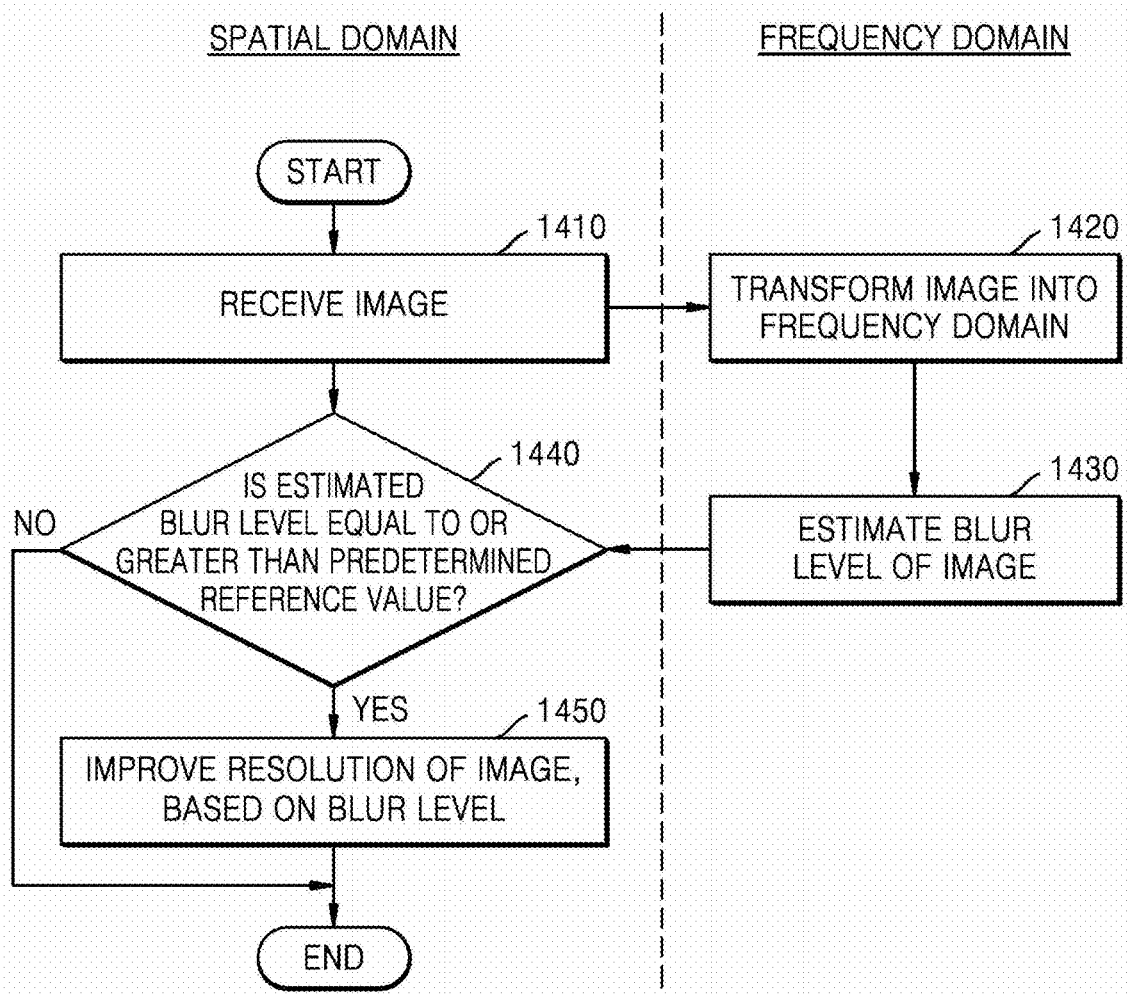
FIG. 14 is a flowchart of an image displaying method according to another embodiment.

FIG. 14 is a flowchart of an image displaying method according to an embodiment. Referring to FIG. 14, the image display apparatus 200 may receive an image (operation 1410) and may transform the image into a frequency domain (operation 1420). The image display apparatus 200 may estimate the blur level of the image in the frequency domain (operation 1430), and may determine whether the estimated blur level is equal to or greater than the predetermined reference value (operation 1440). When the estimated blur level is neither equal to nor greater than the predetermined reference value, namely, when a blur degree is low, the image display apparatus 200 may output the image without performing resolution improvement with respect to the image.

When the estimated blur level is equal to or greater than the predetermined reference value, namely, when the blur degree is high, namely, is equal to or higher a certain reference value and thus it is determined that the definition of the image is low, the image display apparatus 200 may improve the resolution of the image, based on the blur level (operation 1450).

As such, according to an embodiment, the image display apparatus 200 may improve the resolution of the image only when the estimated blur level is equal to or greater than the predetermined reference value, thereby preventing execution of unnecessary operations with respect to an image having a low blur degree.

Figure 15:
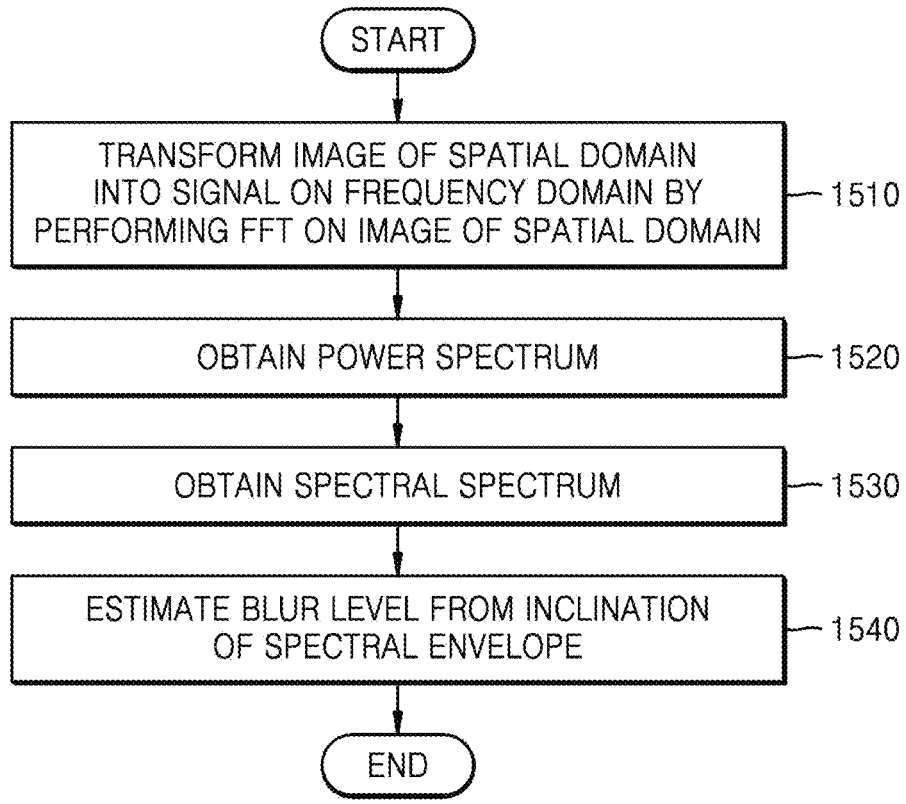
FIG. 15 is a flowchart of a process of estimating a blur level, according to an embodiment.

FIG. 15 is a flowchart of a process of estimating a blur level, according to an embodiment. Referring to FIG. 15, the image display apparatus 200 may transform an image of the spatial domain into a signal on the frequency domain by performing a Fourier transform on the image of the spatial domain (operation 1510). The image display apparatus 200 may obtain a power spectrum from the signal obtained via the Fourier transform (operation 1520). The image display apparatus 200 may perform log normalization with respect to the signal obtained via the Fourier transform, and may obtain a power spectrum by moving a spectrum such that the origin is located at the center.

The image display apparatus 200 may obtain a spectral spectrum from the power spectrum (operation 1530). The image display apparatus 200 may obtain the spectral envelope by using a center value of the power spectrum or a column or a row around the center value.

The image display apparatus 200 may estimate the blur level from the inclination of the spectral envelope (operation 1540). When there is a section where the inclination of the spectral envelope suddenly changes, the image display apparatus 200 may estimate the blur level of the image by using a bin index value of a point where the inclination of the spectral envelope starts to suddenly change. Alternatively, the image display apparatus 200 may estimate the blur level of the image by using an inclination value in the section where the spectral envelope suddenly changes. Alternatively, the image display apparatus 200 may estimate the blur level of the image by using a ratio, percentage, or the like between the section where the spectral envelope suddenly changes and a section where the spectral envelope gently changes.

Figure 16:
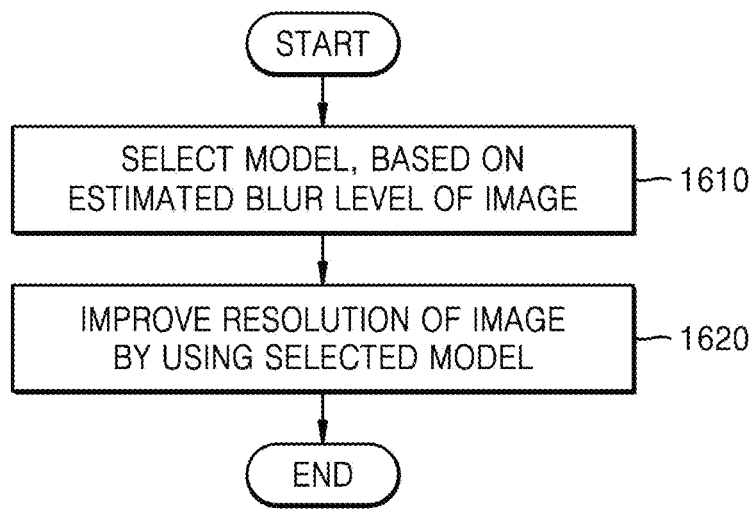
FIG. 16 is a flowchart of selection of a model by using a blur level, according to an embodiment.

FIG. 16 is a flowchart of selection of a model by using a blur level, according to an embodiment.

The image display apparatus 200 may select one or more from a plurality of image restoration models by using an estimated blur level of an image (operation 1610). According to an embodiment, an image restoration model may be a learning model using one or more neural networks. According to an embodiment, image restoration models usable by the image display apparatus 200 to improve the resolution of the image may be classified into several models according to an image restoration method, the type of used neural network, the type of training data, and the like.

For example, an image restoration model may improve the resolution of an image by restoring the image according to a method of comparing and learning the image, by using a DCNN. Alternatively, another image restoration model may perform an operation via a deep neural network, and thus improve the resolution of the image according to a method of recognizing an object included in the image and restoring the recognized object by using various pieces of training data. Alternatively, another image restoration model may improve the resolution of the image by filling a blank between pixels generated by magnifying the image with parameter data inferred using a deep learning network. Alternatively, another image restoration model may improve the resolution of the image by connecting a low-resolution image to a high-resolution and high-definition image and thus adding details of an output image.

According to an embodiment, the image display apparatus 200 may select a neural network capable of restoring a most optimized image from an image having the estimated blur level, from among the plurality of neural network models usable to improve the resolution of the image, and may improve the resolution of the image by using the selected image restoration model (operation 1620).

Figure 17:
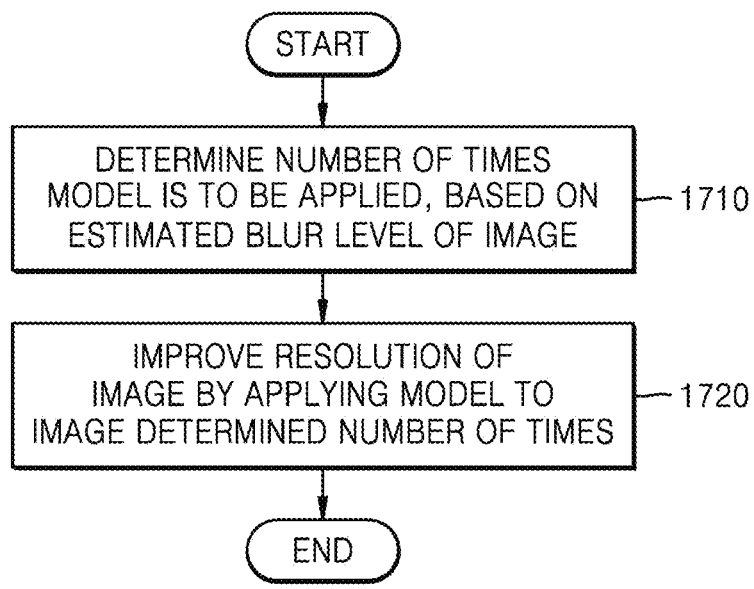
FIG. 17 is a flowchart of selection of a model by using a blur level, according to an embodiment.

FIG. 17 is a flowchart of selection of a model by using a blur level, according to an embodiment.

The image display apparatus 200 may determine the number of times a model is to be applied, based on an estimated blur level of an image (operation 1710). For example, it is assumed that the estimated blur level of the image is 4. This may refer to a case where the image is magnified four times and is thus blurry. It is also assumed that an image restoration model used by the image display apparatus 200 is a model capable of improving the resolution of the image twice at a time. In this case, the image display apparatus 200 may determine that the number of times to apply the model is two.

The image display apparatus 200 may improve the resolution of the image by applying the model to the image the determined number of times (operation 1720). In other words, in the above example, the image display apparatus 200 may input the image to the model and may input a result output by the model back to the model. In other words, the image display apparatus 200 may improve the resolution of the image four times by using the model twice.

Figure 18:
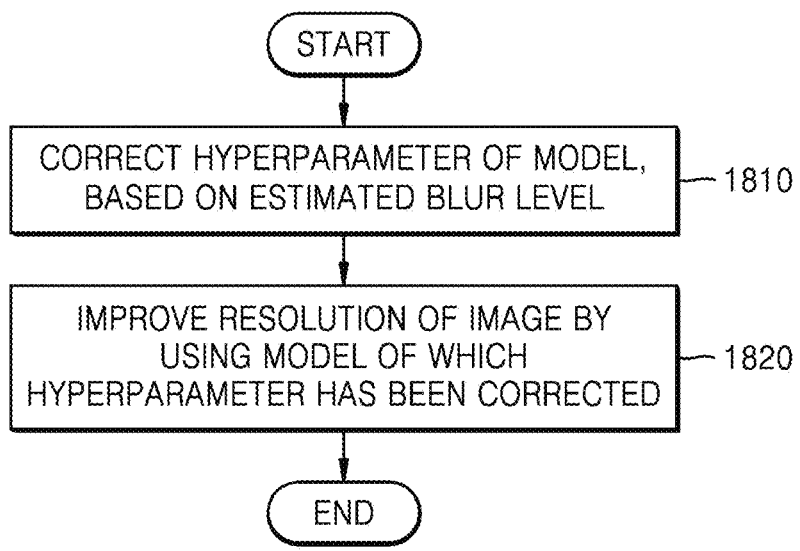
FIG. 18 is a flowchart of a process of improving the resolution of an image by correcting a hyperparameter of a model by using a blur level, according to an embodiment.

FIG. 18 is a flowchart of a process of improving the resolution of an image by correcting a hyperparameter of a model by using a blur level, according to an embodiment.

Referring to FIG. 18, the image display apparatus 200 may correct the hyperparameter of an image restoration model, based on an estimated blur level (operation 1810).

According to an embodiment, when the image restoration model is a neural network, the image display apparatus 200 may change a value of at least one hyperparameter of the neural network by referring to the blur level of the image. For example, the image display apparatus 200 may change the depths of a convolution layer and a pooling layer or the depth of a hidden layer, according to the blur level. Additionally or alternatively, the image display apparatus 200 may correct the weight value of one or more of the nodes included in a plurality of layers in the neural network according to the blur level. Additionally or alternatively, the image display apparatus 200 may correct the structure, configuration, shape, or the like of the neural network according to the blur level.

The image display apparatus 200 may improve the resolution of the image by using a model of which at least one of the above-described various hyperparameters has been corrected (operation 1820).

Figure 19:
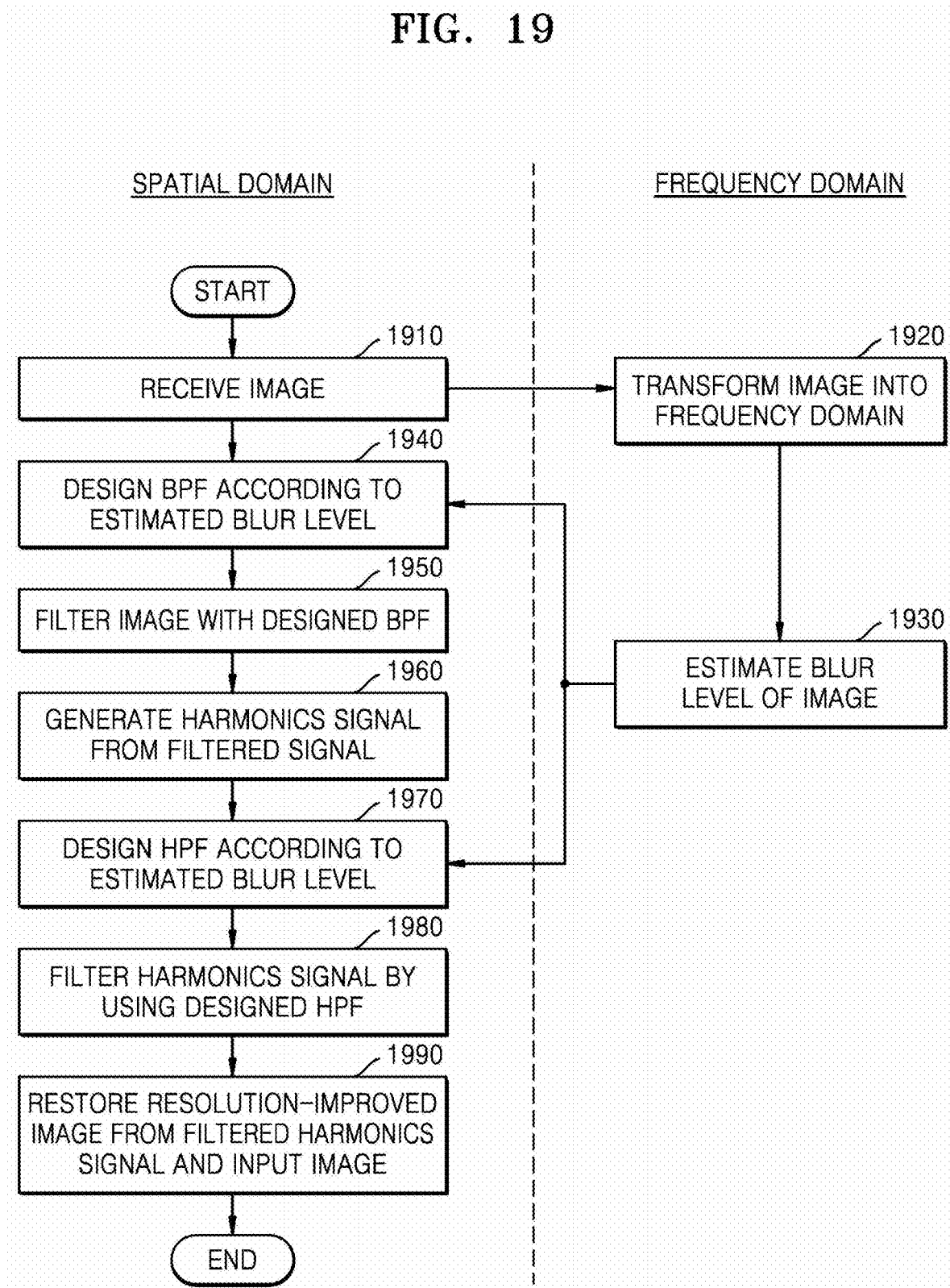
FIG. 19 is a flowchart of a process of designing a filter by using an estimated blur level and improving the resolution of an image by using the filter, according to an embodiment.

FIG. 19 is a flowchart of a process of designing a filter by using an estimated blur level and improving the resolution of an image by using the filter, according to an embodiment.

Referring to FIG. 19, when the image display apparatus 200 receives an image (operation 1910), the image display apparatus 200 may transform the received image into a signal on a frequency domain (operation 1920). The image display apparatus 200 may estimate the blur level of the image from the signal on the frequency domain (operation 1930).

The image display apparatus 200 may improve the resolution of the image in the spatial domain by using the estimated blur level. A blur being in an image may refer to a loss of a high frequency component of the image. Accordingly, the image display apparatus 200 may filter out a signal of a frequency band that is not lost, by using a band pass filter (BPF). To this end, the image display apparatus 200 may design a BPF according to the estimated blur level (operation 1940). The BPF is a filter that transmits only a signal of a specific frequency band.

According to an embodiment, the image display apparatus 200 may design a filter having suitable values of the hyperparameters according to the estimated blur level. For example, the image display apparatus 200 may determine values of the hyperparameters related to filter designing, such as a bandwidth B, a center frequency f0, a high cutoff frequency fH, and a low cutoff frequency fL of the BPF, according to the estimated blur level, and design a filter having these values of the hyperparameters. The image display apparatus 200 may obtain only a signal of a loss-less frequency band by filtering the image with the designed BPF (operation 1950).

The image display apparatus 200 may generate a harmonics signal from the filtered signal (operation 1960). The harmonics signal may refer to a signal having a frequency component that is a multiple of a fundamental frequency. The image display apparatus 200 may generate the harmonics signal by applying a nonlinear transistor or device to the filtered signal (operation 1960). The harmonics signal generated by applying the nonlinear transistor or device may include a low frequency component and a high frequency component.

According to an embodiment, the image display apparatus 200 may design a high pass filter (HPF) according to the estimated blur level (operation 1970). The HPF is a filter that transmits only a component of a high frequency band and cuts off a component of a low frequency band. The image display apparatus 200 may design a cut-off frequency fc of the HPF according to the estimated blur level.

The image display apparatus 200 filters out only a high frequency component from the harmonics signal by using the designed HPF (operation 1980). The image display apparatus 200 may restore an image by using the harmonics signal of a high frequency band instead of a lost high frequency component. In other words, the image display apparatus 200 may add a signal of a high frequency component filtered out by the HPF to a signal of a frequency band not filtered out by the HPF from the original input image, to generate an image having a restored lost high frequency component (operation 1990).

As such, according to an embodiment, the image display apparatus 200 may design a filter, based on the estimated blur level, and may improve the resolution of the image by using the designed filter.

Figure 20:
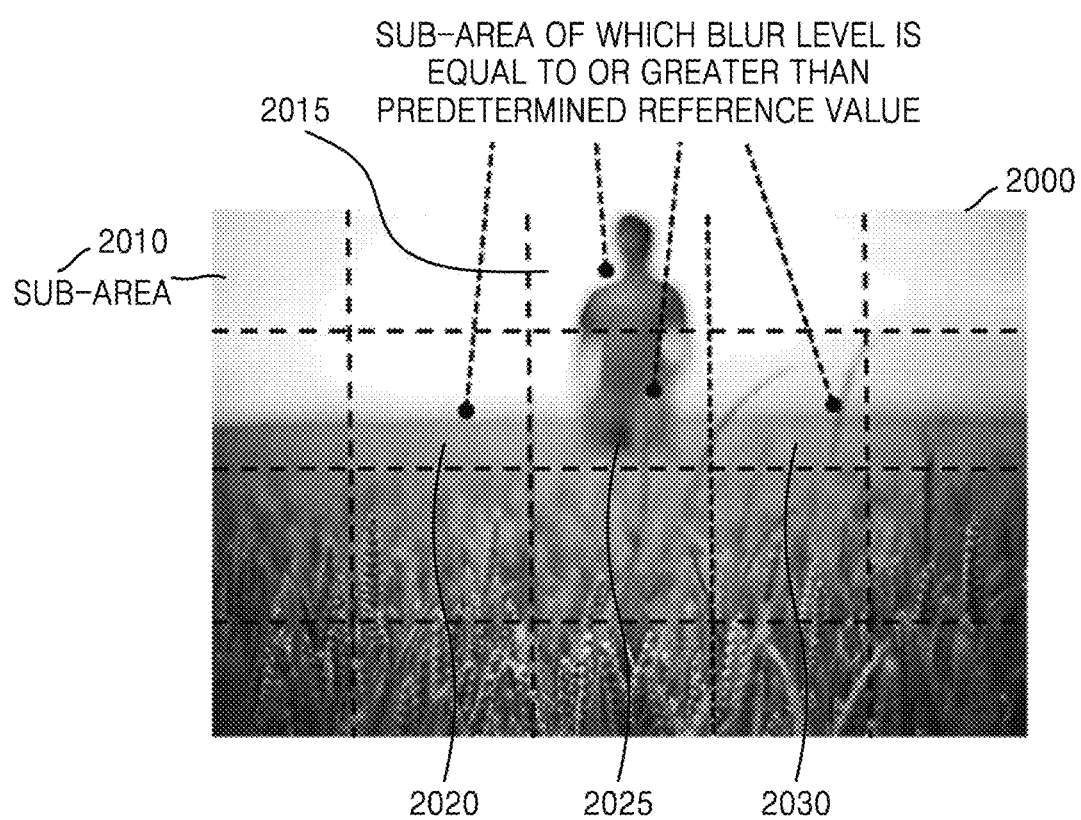
FIG. 20 is a view for explaining estimation of a blur level of each sub-area included in an image, according to an embodiment.

FIG. 20 is a view for explaining estimation of a blur level of each sub-area included in an image, according to an embodiment.

The image display apparatus 200 may estimate a blur level for the single entire image and may improve the resolution of the entire image, based on the estimated blur level. However, according to an embodiment, the image display apparatus 200 may divide the image into a plurality of sub-areas and may estimate a blur level of each of the plurality of sub-areas. The image display apparatus 200 may independently improve the respective resolutions of the plurality of sub-areas according to the respective estimated blur levels.

According to an embodiment, the image display apparatus 200 may estimate the blur level of each of the sub-areas instead of the blur level of the entire image, by using the same method as the method described above with reference to FIGS. 2 through 19.

To this end, the image display apparatus 200 may divide an image 2000 into a plurality of sub-areas. For example, as shown in FIG. 20, the image display apparatus 200 may divide the image 2000 into 20 sub-areas.

One sub-area 2010 may be an area including a predetermined number of pixels. The number of sub-areas 2010 or the size of each sub-area 2010 may be previously set by a user or the image display apparatus 200, or may be set or changed by the user or the image display apparatus 200 in accordance with an image. The user or the image display apparatus 200 may adjust the number of sub-areas 2010 or the size of each sub-area 2010 for each image so that the image is divided more densely or, conversely, more sparsely.

The image display apparatus 200 may estimate a blur level of each image divided into the plurality of sub-areas 2010. The image display apparatus 200 may identify a sub-area of which the blur level satisfies a predetermined criterion, based on the estimated blur level of each sub-area. For example, in FIG. 20, the image display apparatus 200 may identify sub-areas 2015, 2020, 2025, and 2030 of which respective blur levels are equal to or greater than a predetermined reference value from among the 20 sub-areas. The image display apparatus 200 may improve respective resolutions of only the sub-areas 2015, 2020, 2025, and 2030 of which respective blur levels are equal to or greater than the predetermined reference value.

Figure 21:
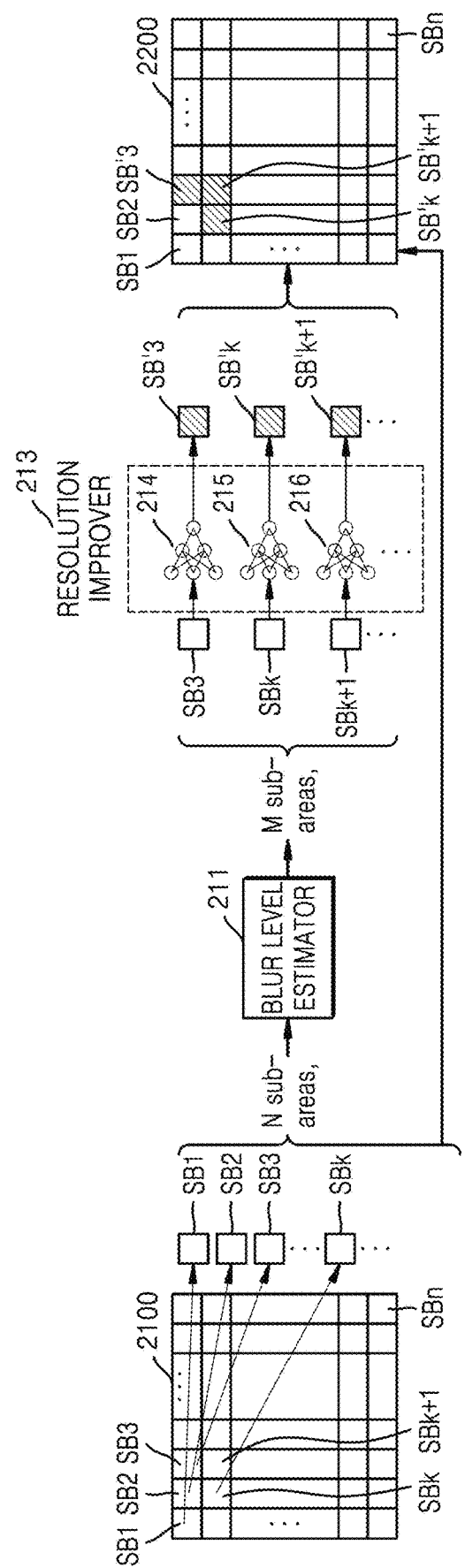
FIG. 21 is a view for explaining improvement of a resolution of each of a plurality of sub-areas included in an image, according to an embodiment.

FIG. 21 is a view for explaining improvement of a resolution of each of a plurality of sub-areas included in an image, according to an embodiment.

Referring to FIG. 21, the image display apparatus 200 may split an input image 2100 into N sub-areas. The image display apparatus 200 may obtain N sub-areas SB1, SB2, SB3, . . . , and SBk, SBk+1, . . . , and SBn.

The blur level estimator 211 of the image display apparatus 200 may transform each of the N sub-areas SB1, SB2, SB3, . . . , and SBk, SBk+1, . . . , and SBn into the frequency domain. In other words, the blur level estimator 211 may obtain a signal on the frequency domain for each of the N sub-areas SB1, SB2, SB3, . . . , and SBk, SBk+1, . . . , and SBn by performing a Fourier transform with respect to each of the N sub-areas SB1, SB2, SB3, . . . , and SBk, SBk+1, . . . , and SBn. The blur level estimator 211 may obtain a power spectrum for the signal on the frequency domain, and may obtain a spectral envelope from the power spectrum. The blur level estimator 211 may estimate a blur level of each sub-area from the inclination of the spectral envelope obtained for each of the N sub-areas. The blur level estimator 211 may estimate the blur level by using a bin index value of a point where the inclination of the spectral envelope starts to change to be greater than the predetermined reference value. Alternatively, the blur level estimator 211 may estimate the blur level by using an inclination value in the section where the spectral envelope suddenly changes, or may estimate the blur level of the image by using a ratio, percentage, or the like between the section where the spectral envelope suddenly changes and a section where the spectral envelope smoothly changes.

The blur level estimator 211 may inform the resolution improver 213 of the estimated blur level of each of the N sub-areas. The resolution improver 213 may identify M (where M is a natural number less than or equal to N) sub-areas of which respective blur levels are equal to or greater than the predetermined reference value, by using the respective estimated blur levels of the N sub-areas.

Alternatively, according to an embodiment, the blur level estimator 211 may identify the M sub-areas of which respective blur levels are equal to or greater than the predetermined reference value from among the N sub-areas, and may inform the resolution improver 213 of the identified M sub-areas and the respective blur levels of the identified M sub-areas.

According to an embodiment, the resolution improver 213 may perform resolution improvement with respect to only the M sub-areas SB3, SBk, SBk+1, . . . , of which respective blur levels are equal to or greater than the predetermined reference value, in the spatial domain, by using information received from the blur level estimator 211. The resolution improver 213 may omit a process of unnecessarily improving a resolution of a sub-area of which a blur level is not high, by omitting resolution improvement with respect to (N−M) sub-areas of which respective blur levels are less than the predetermined reference value.

According to an embodiment, the resolution improver 213 may improve the respective resolutions of the M sub-areas by using a plurality of AI models. For example, in FIG. 21, the resolution improver 213 may independently improve the respective resolutions of the sub-areas SB3, SBk, and SBk+1 by using AI models 214, 215, and 216, respectively.

According to an embodiment, each of the plurality of AI models 214, 215, and 216 may be an image restoration model capable of outputting a result in which resolution has been optimally improved according to the blur level of each of the sub-areas SB3, SBk, and SBk+1 by using one or a plurality of neural networks.

To this end, the resolution improver 213 may select an image restoration model capable of optimally improving resolution of each sub-area from among the plurality of neural network models according to the estimated blur level of each sub-area, or directly design the image restoration model.

According to an embodiment, the resolution improver 213 may select a neural network capable of optimally restoring the sub-area SB3 from among a plurality of neural networks usable for resolution improvement, by using the estimated blur level of the sub-area SB3 from among the M sub-areas. The resolution improver 213 may improve the resolution of sub-area SB3 by using the AI model 214 based on the selected neural network.

According to an embodiment, the resolution improver 213 may determine the number of times to apply an image restoration model in order to optimally improve the resolution of the sub-area SB3. The resolution improver 213 may optimally improve the resolution of the sub-area SB3 by repeatedly applying the image restoration model to the sub-area SB3 the determined number of times.

According to an embodiment, the resolution improver 213 may correct various values of hyperparameters that are used in a neural network according to the estimated blur level. The resolution improver 213 may select a value of a hyperparameter for a model having optimal performance that is to be applied to the sub-area SB3, by correcting at least one of the various values of the hyperparameters such as a filter size, a filter coefficient, a kernel size, and weight values of a node, according to the estimated blur level of the sub-area SB3. The resolution improver 213 may optimally improve the resolution of the sub-area SB3 by using the AI model 214 having the at least one corrected value of the hyperparameter.

According to an embodiment, the resolution improver 213 may design a filter that is to perform image restoration according to the estimated blur level. The resolution improver 213 may improve the resolution of the sub-area SB3 according to a method of designing a BPF, an HPF, or the like having different bandwidths according to the estimated blur level of the sub-area SB3 and changing the signal of the high frequency band in the sub-area SB3 by using the AI model 214 using the designed filter.

The resolution improver 213 may search for the AI model 214 capable of optimally improving the resolution of the sub-area SB3, according to the estimated blur level of the sub-area SB3, by using the above-described various methods. The resolution improver 213 may optimally improve the resolution of the sub-area SB3 by using the AI model 214.

Similarly, the resolution improver 213 may search for the AI model 215 capable of optimally improving the resolution of the sub-area SB3, according to the estimated blur level of the sub-area SBk from among the M sub-areas, and may optimally improve the resolution of the sub-area SBk by using the AI model 215.

The AI model 215 used to improve the resolution of the sub-area SBk may be the same as or different from the AI model 214 used to improve the resolution of the sub-area SB3. Even when image restoration models used by the resolution improver 213 to improve the respective resolutions of the sub-area SB3 and the sub-area SBk, respectively, are the same as each other, the values of the hyperparameters used in the AI model 214 and the AI model 215 as the image restoration models, respectively, may be different from each other. Each of the plurality of AI models 214, 215, and 216 may be implemented in various types according to an image restoration method, the type of used neural network, the type of training data, or the like.

The resolution improver 213 may optimally improve the respective resolutions of the sub-areas SB3, SBk, and SBk+1 by using the image restoration models 214, 215, and 216 capable of outputting results of optimally improving the respective resolutions of the sub-areas SB3, SBk, and SBk+1 according to the blur levels of the sub-areas SB3, SBk, and SBk+1. The image display apparatus 200 may obtain resolution-improved sub-areas SB3', SB'k, and SB'k+1, and may generate an output image 2200 including both the resolution-improved sub-areas SB3', SB'k, and SB'k+1 and other sub-areas not subjected to resolution improvement. Like the input image 2100, the output image 2200 may include the N sub-areas SB1, SB2, SB3', . . . , and SB'k, SB'k+1, . . . , and SBn. The image display apparatus 200 may output the output image 2200.

As such, according to an embodiment, the image display apparatus 200 may divide an image into a plurality of sub-areas, estimate a blur level of each of the plurality of sub-areas, and improve the resolution of only a sub-area of which a blur level satisfies a certain criterion, thereby omitting a process of unnecessarily improving the resolution of a sub-area of which a blur level is not high.

According to an embodiment, the resolution improver 213 may optimally improve the resolution of each of the plurality of sub-areas by using an image restoration model suitable for each of the plurality of sub-areas according to the estimated blur level of each of the plurality of sub-areas.

Figure 22:
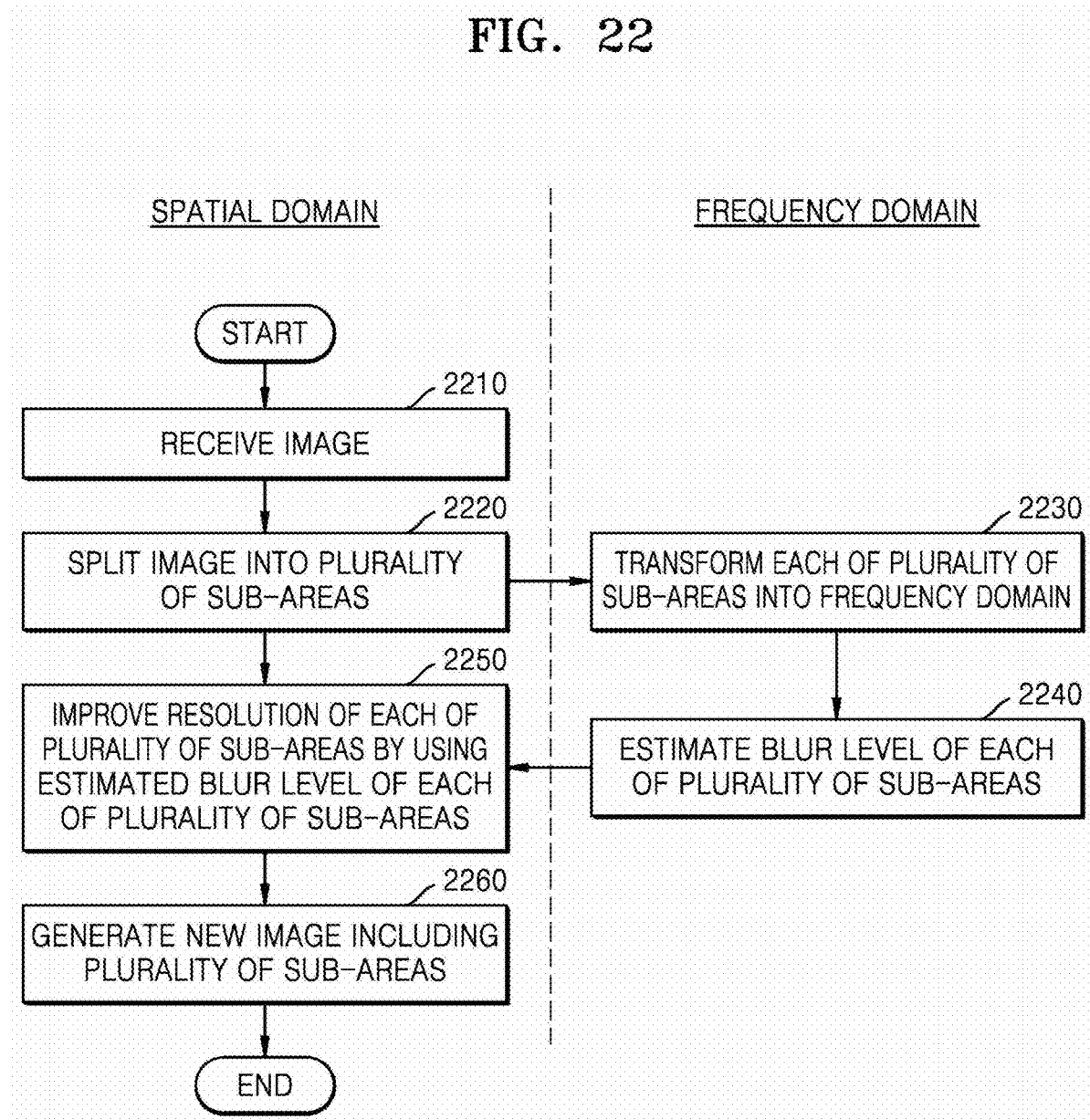
FIG. 22 is a flowchart of an image displaying method according to an embodiment.

FIG. 22 is a flowchart of an image displaying method according to an embodiment. The image display apparatus 200 may receive an image (operation 2210), and may split the image into a plurality of sub-areas (operation 2220). The image display apparatus 200 may transform each of the plurality of sub-areas into a frequency domain (operation 2230).

The image display apparatus 200 may obtain a power spectrum for a signal on the frequency domain for each of the plurality of sub-areas, and may obtain a spectral envelope from the power spectrum. The image display apparatus 200 may estimate a blur level of each sub-area by using, for example, an inclination value of the spectral envelope or a bin index of a point where the inclination of the spectral envelope suddenly changes (operation 2240).

The image display apparatus 200 may improve the resolution of each sub-area in the spatial domain by using the estimated blur level for each sub area (operation 2250).

The image display apparatus 200 may generate a new image including a sub-area having improved resolution (operation 2260).

As such, according to an embodiment, the image display apparatus 200 may estimate the blur level of each sub-area in the frequency domain, and may improve the resolution of each sub-area in the spatial domain by using the estimated blur level.

Figure 23:
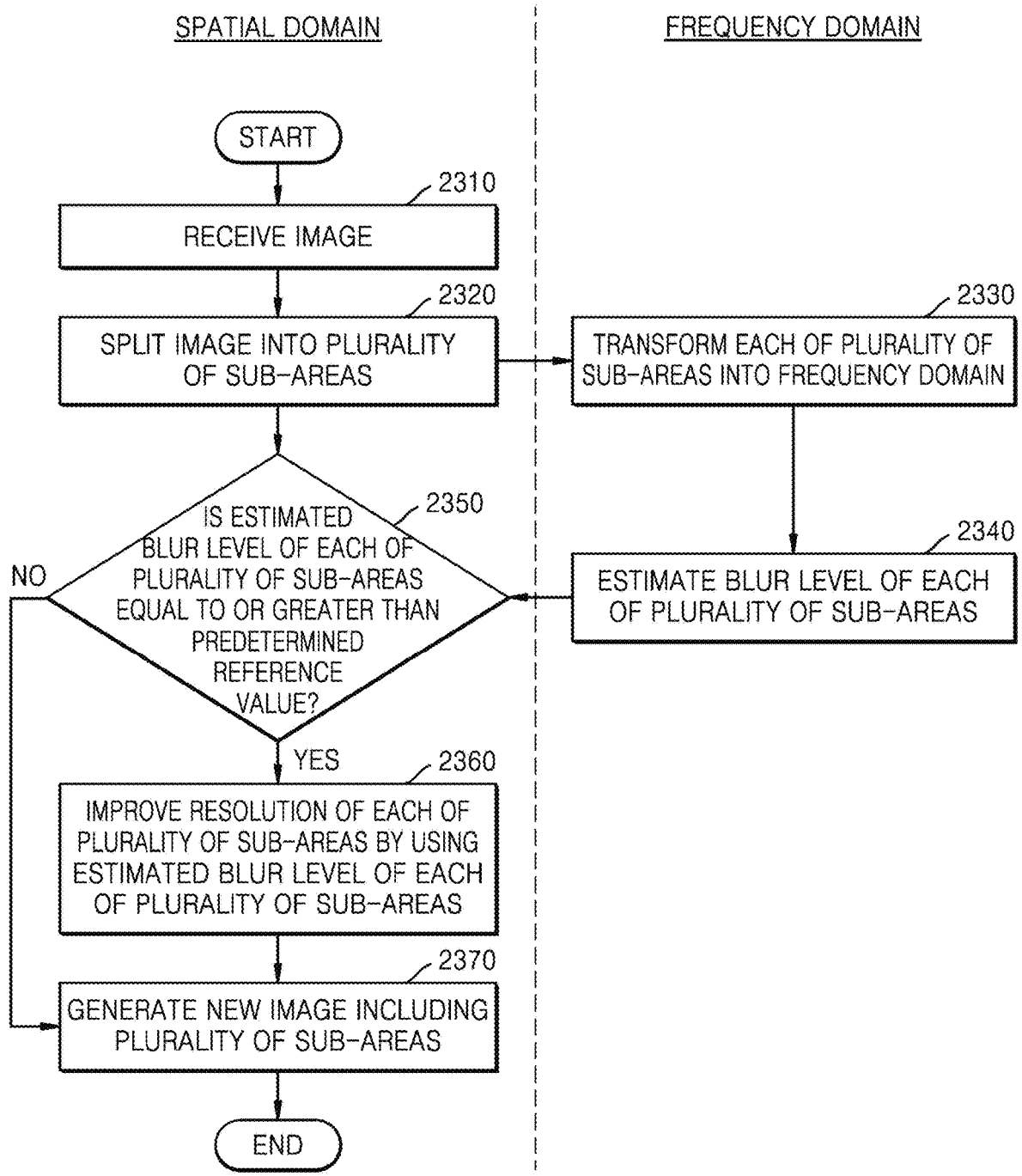
FIG. 23 is a flowchart of an image displaying method according to an embodiment.

FIG. 23 is a flowchart of an image displaying method according to an embodiment. Referring to FIG. 23, the image display apparatus 200 may receive an image (operation 2310), and may split the image into a plurality of sub-areas (operation 2320). The image display apparatus 200 may transform each of the plurality of sub-areas into a frequency domain (operation 2330). The image display apparatus 200 may estimate the blur level of each of the plurality of sub-areas in the frequency domain (operation 2340).

The image display apparatus 200 may determine whether the estimated blur level of each of the plurality of sub-areas is equal to or greater than the predetermined reference value (operation 2350), and may identify a sub-area of which the estimated blur level is equal to or greater than the predetermined reference value. When the estimated blur level of the sub-area is low, the image display apparatus 200 may not perform resolution improvement with respect to the sub-area having the low estimated blur level.

When the estimated blur level is equal to or greater than the predetermined reference value, namely, when the blur degree is high, namely, is equal to or higher the predetermined reference value and thus it is determined that the definition of the sub-area is low, the image display apparatus 200 may improve the resolution of the sub-area (operation 2360). The image display apparatus 200 may independently improve the respective resolutions of the plurality of sub-areas, based on the estimated blur levels of the plurality of sub-areas.

The image display apparatus 200 may generate a new image by including both a sub-area having improved resolution and a sub-area not subjected to resolution adjustment (operation 2370).

As such, according to an embodiment, the image display apparatus 200 may improve the resolution of only the sub-area of which the estimated blur level is equal to or greater than the predetermined reference value, thereby preventing execution of unnecessary operations with respect to a sub-area having a low blur degree.

Image display apparatuses and operation methods thereof, according to some embodiments of the disclosure, may be embodied as a storage medium including instruction codes executable by a computer such as a program module executed by the computer. A computer-readable medium may be any available medium which may be accessed by the computer and includes all types of a volatile or non-volatile and removable or non-removable medium. Further, the computer-readable medium may include all types of computer storage and communication medium.

The computer storage medium includes all types of a volatile or non-volatile and removable or non-removable medium that is embodied by a certain method or technology for storing information such as computer-readable instruction code, a data structure, a program module or other data. The communication medium typically includes the computer-readable instruction code, the data structure, the program module, or other data of a modulated data signal, or other transmission mechanism, and includes any information transmission medium.

The terminology "~unit" used herein may be a hardware component such as a processor or a circuit, and/or a software component that is executed by a hardware component such as a processor.

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing operations may employ any number of related art techniques for electronics configuration, signal processing and/or control, data processing and the like.

The image display apparatuses and operation methods thereof, according to the above-described embodiments of the disclosure, may be implemented as computer program products including a recording medium having stored therein a program for performing an image displaying method including estimating a blur level of each of a plurality of sub-areas included in a first image, improving the respective resolution(s) of one or more sub-areas from among the plurality of sub-areas, based on the estimated blur level of the one or more sub-areas, and outputting a second image including the one or more sub-areas having improved resolution(s).

In an image display apparatus and an image displaying method according to an embodiment, the blur level of an image may be estimated in the frequency domain.

In the image display apparatus and the image displaying method according to an embodiment, the resolution of the image may be improved in the spatial domain, by using one or more of a model and a filter both suitable for the image based on the estimated blur level.

In the image display apparatus and the image displaying method according to an embodiment, a blur level of each sub-area included in the image may be estimated, and the resolution of each sub-area may be improved using the estimated blur level.

Although the examples of the disclosure have been disclosed for illustrative purposes, one of ordinary skill in the art will appreciate that diverse variations and modifications are possible, without departing from the spirit and scope of the disclosure. Thus, the above embodiments of the disclosure should be understood not to be restrictive but to be illustrative, in all aspects. For example, respective elements described in an integrated form may be dividedly used, and the divided elements may be used in a state of being combined.

What is claimed is:

1. An image display apparatus comprising:
a display;
a memory storing at least one instruction; and
a processor configured to execute at least one instruction stored in the memory to:
estimate a blur level of each sub-area of a plurality of sub-areas included in a first image; and improve a resolution of at least one sub-area of the plurality of sub-areas, based on an estimated blur level of the at least one sub-area, wherein the display is configured to output a second image including the at least one sub-area having the improved resolution, and wherein the processor is further configured to execute the at least one instruction to:

split the first image into the plurality of sub-areas in a spatial domain;

transform each sub-area of the plurality of sub-areas into a frequency domain, and estimate the blur level of each sub-area of the plurality of sub-areas in the frequency domain; and improve the resolution of the at least one sub-area in the spatial domain.

2. The image display apparatus of claim 1, wherein the processor is further configured to execute the at least one instruction to identify at least one sub-area of which the estimated blur level is equal to or greater than a threshold value, and improve a resolution of the identified at least one sub-area.

3. The image display apparatus of claim 1, wherein the processor is further configured to execute the at least one instruction to obtain a signal on the frequency domain by performing a Fourier transform on each sub-area of the plurality of sub-areas, obtain a power spectrum for the signal on the frequency domain, and estimate the blur level of each sub-area of the plurality of sub-areas from an inclination of a spectral envelope obtained from the power spectrum.

4. The image display apparatus of claim 3, wherein the processor is further configured to execute the at least one instruction to obtain a bin index of a point at which the inclination of the spectral envelope starts to change to be greater than a predetermined reference value, and estimate the blur level to increase as a value of the bin index increases.

5. The image display apparatus of claim 1, wherein the processor is further configured to execute the at least one instruction to independently improve respective resolutions of at least two sub-areas of the plurality of sub-areas, based on the estimated blur level of each sub-area of the at least two sub-areas.

6. The image display apparatus of claim 5, wherein the processor is further configured to execute the at least one instruction to design a filter, based on the estimated blur level of the at least one sub-area, and improve a resolution of a sub-area by applying the designed filter to the sub-area.

7. The image display apparatus of claim 6, wherein the processor is further configured to execute the at least one instruction to:

obtain a signal of a predetermined band by filtering the sub-area, by using a band pass filter (BPF) designed based on the estimated blur level of the at least one sub-area;

generate a harmonics signal by applying a nonlinear function to the obtained signal of the predetermined band;

obtain a signal of a high frequency band from the harmonics signal by filtering the harmonics signal by using a high pass filter (HPF) designed based on the estimated blur level; and generate the sub-area having an improved resolution, from the obtained signal of the high frequency band and a signal of the sub-area in a band other than the high frequency band.

8. The image display apparatus of claim 1, wherein the processor is further configured to execute the at least one instruction to select an image restoration model from a plurality of image restoration models, based on the estimated blur level of the at least one sub-area, and improve a resolution of a sub-area, according to the selected image restoration model.

9. The image display apparatus of claim 1, wherein the processor is further configured to execute the at least one instruction to determine a number of times to apply an image restoration model, based on the estimated blur level of the at least one sub-area, and improve a resolution of a sub-area by repeatedly applying the image restoration model to the sub-area the determined number of times.

10. The image display apparatus of claim 1, wherein the processor is further configured to execute the at least one instruction to correct a value of a hyperparameter of a neural network, based on the estimated blur level of the at least one sub-area, and improve a resolution of a sub-area by using the neural network having the corrected value of the hyperparameter.

11. The image display apparatus of claim 10, wherein the value of the hyperparameter includes at least one of a filter coefficient, a filter size, a kernel size, or a weight value of a node of the neural network.

12. An image displaying method comprising:

estimating a blur level of each sub-area of a plurality of sub-areas included in a first image;

improving a resolution of at least one sub-area of the plurality of sub-areas, based on an estimated blur level of the at least one sub-area; and outputting a second image including the at least one sub-area of which the resolution has been improved, wherein the estimating comprises:

splitting the first image into the plurality of sub-areas in in the spatial domain; and transforming each sub-area of the plurality of sub-areas into a frequency domain and estimating the blur level of each sub-area of the plurality of sub-areas in the frequency domain, and wherein the improving comprises improving the resolution of the at least one sub-area in the spatial domain.

13. The image displaying method of claim 12, wherein the improving further comprises:

identifying at least one sub-area of which the estimated blur level is equal to or greater than a threshold value; and improving a resolution of the identified at least one sub-area.

14. The image displaying method of claim 13, wherein the transforming each sub-area and the estimating the blur level comprises:

obtaining a signal on the frequency domain by performing Fourier transformation on each sub-area of the plurality of sub-areas;

obtaining a power spectrum for the signal on the frequency domain;

obtaining a bin index of a point at which an inclination of a spectral envelope, obtained from the power spectrum, starts to change to be greater than a predetermined reference value; and estimating the blur level to increase as a value of the bin index increases.

15. The image displaying method of claim 12, wherein the improving the resolution of the at least one sub-area comprises independently improving respective resolutions of at least two sub-areas of the plurality of sub-areas, based on an estimated blur level of each sub-area of the at least two sub-areas.

16. The image displaying method of claim 12, wherein the improving the resolution of the at least one sub-area comprises:
   selecting an image restoration model from a plurality of image restoration models, based on the estimated blur level of the at least one sub-area; and
   improving a resolution of a sub-area according to the selected image restoration model.

17. The image displaying method of claim 12, wherein the improving the resolution of the at least one sub-area comprises:
   determining a number of times to apply an image restoration model, based on the estimated blur level of the at least one sub-area; and
   improving a resolution of a sub-area by repeatedly applying the image restoration model to the sub-area the determined number of times.

18. The image displaying method of claim 12, wherein the improving the resolution of the at least one sub-area comprises:
   correcting a value of a hyperparameter of a neural network, based on the estimated blur level of the at least one sub-area; and
   improving a resolution of a sub-area by using the neural network having the corrected value of the hyperparameter.

19. A non-transitory computer-readable recording medium having recorded thereon a program executable by at least one processor to perform an image displaying method comprising:
   estimating a blur level of each sub-area of a plurality of sub-areas included in a first image;
   improving a resolution of at least one sub-area of the plurality of sub-areas, based on an estimated blur level of the at least one sub-area; and
   outputting a second image including the at least one sub-area of which the resolution has been improved,
   wherein the estimating comprises:
   splitting the first image into the plurality of sub-areas in in the spatial domain; and
   transforming each sub-area of the plurality of sub-areas into a frequency domain and estimating the blur level of each sub-area of the plurality of sub-areas in the frequency domain, and
   wherein the improving comprises improving the resolution of the at least one sub-area in the spatial domain.

* * * * *